United States Patent
Sun et al.

(10) Patent No.: US 11,889,546 B2
(45) Date of Patent: *Jan. 30, 2024

(54) BEAM REFINEMENT TECHNIQUES FOR RANDOM ACCESS COMMUNICATIONS

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US); Mahmoud Taherzadeh Boroujeni, San Diego, CA (US); Juan Montojo, San Diego, CA (US); Peter Gaal, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 17/231,805

(22) Filed: Apr. 15, 2021

(65) Prior Publication Data

US 2021/0329691 A1 Oct. 21, 2021

Related U.S. Application Data

(60) Provisional application No. 63/011,764, filed on Apr. 17, 2020.

(51) Int. Cl.
*H04W 74/00* (2009.01)
*H04W 74/08* (2009.01)
(Continued)

(52) U.S. Cl.
CPC ......... *H04W 74/006* (2013.01); *H04W 16/28* (2013.01); *H04W 56/001* (2013.01); *H04W 74/008* (2013.01); *H04W 74/0833* (2013.01)

(58) Field of Classification Search
CPC ............. H04W 74/006; H04W 74/008; H04W 74/0833; H04W 16/28; H04W 56/001
(Continued)

(56) References Cited

U.S. PATENT DOCUMENTS

2018/0124724 A1* 5/2018 Tsai ................. H04W 74/0833
2019/0110314 A1 4/2019 Abedini et al.
(Continued)

FOREIGN PATENT DOCUMENTS

CN 107360628 A 11/2017
CN 110380837 A 10/2019

OTHER PUBLICATIONS

International Search Report and Written Opinion—PCT/US2021/027669—ISA/EPO—dated Jul. 9, 2021.

*Primary Examiner* — Candal Elpenord
(74) *Attorney, Agent, or Firm* — Holland & Hart LLP

(57) ABSTRACT

Methods, systems, and devices for wireless communications are described in which a base station and a user equipment (UE) may perform beam refinement within a random access procedure. A UE may transmit a random access request to the base station and, in response thereto, the base station may transmit a control channel order to the UE that indicates to transmit a modified random access request. Resources for the modified random access request may be determined based on the random access request, the control channel order, configured resources, or combinations thereof. The base station may monitor for the modified random access request using different beamforming parameters and determine a refined beam for a subsequent transmission in the random access procedure. The base station may use the refined beam to transmit a random access response to the UE, and complete the access procedure.

30 Claims, 24 Drawing Sheets

(51) Int. Cl.
*H04W 56/00* (2009.01)
*H04W 16/28* (2009.01)
(58) Field of Classification Search
USPC .................................................. 370/329–330
See application file for complete search history.

(56) References Cited

U.S. PATENT DOCUMENTS

| 2020/0229241 A1* | 7/2020 | Jeon | H04W 74/0833 |
| 2020/0351955 A1* | 11/2020 | Jeon | H04L 1/1642 |
| 2022/0201773 A1* | 6/2022 | Jeon | H04W 74/006 |
| 2022/0240326 A1* | 7/2022 | Rune | H04W 74/0866 |

* cited by examiner

BEAM REFINEMENT TECHNIQUES FOR RANDOM ACCESS COMMUNICATIONS

CROSS REFERENCE

The present application for patent claims the benefit of U.S. Provisional Patent Application No. 63/011,764 by SUN et al., entitled "BEAM REFINEMENT TECHNIQUES FOR RANDOM ACCESS COMMUNICATIONS," filed Apr. 17, 2020, assigned to the assignee hereof, and expressly incorporated by reference herein.

FIELD OF TECHNOLOGY

The following relates generally to wireless communications and more specifically to beam refinement techniques for random access communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In a mmW system, a base station and a UE may communicate via one or more directional beams. A transmitter (e.g. a base station) may engage in a beam sweeping procedure to establish an active beam pair with a receiver (e.g., a UE). An active beam pair may include an active transmit beam of the transmitter and a corresponding active receive beam of the receiver. The transmit beams and the receive beams in an active beam pair may be refined through, for example, beam refinement procedures. Techniques that may provide more efficient beam refinement may be desirable to help enhance network efficiency.

SUMMARY

The described techniques relate to improved methods, systems, devices, and apparatuses that support random access with beam refinement in wireless communications. Various described techniques provide that a base station and a user equipment (UE) may use multiple transmissions associated with an access procedure (e.g., a random access procedure) to refine a beam that is used for subsequent portions of the access procedure. In some cases, a UE may transmit a random access request to the base station and, in response thereto, the base station may transmit a physical downlink control channel (PDCCH) order to the UE. The PDCCH order may indicate that the UE is to transmit one or more modified random access requests to the base station. Resources and transmission parameters for the one or more modified random access requests may be determined based on various techniques discussed herein.

In some cases, random access occasions (ROs) for transmission of the initial random access request and the modified random access request(s) may each be associated with a same synchronization signal block. In some cases, a first subset of preambles may be used for the initial random access requests, and a second subset of preambles may be used for modified random access requests, and an initial versus modified random access request may be differentiated based on the associated preamble sequence. In some cases, a separate set of ROs may be configured for modified random access requests that is separate from an initial set of ROs for initial random access requests. In some cases, ROs for modified random access requests may be unassociated with a particular SSB, and such ROs may be identified based on one or more configured parameters, which may be triggered by the PDCCH order.

The base station may monitor for the one or more modified random access requests using different beamforming parameters in order to determine a refined beam to be used for a subsequent transmission in the random access procedure. The base station may then use the refined beam to transmit a random access response to the UE, and complete the access procedure. The refined beam may provide for more reliable reception of the random access response at the UE, and thereby enhance the reliability and efficiency of communications.

A method of wireless communication at a UE is described. The method may include transmitting an initial random access request to a base station to establish a wireless connection with the base station, receiving a control channel order from the base station responsive to the initial random access request, determining, based on the control channel order, a set of resources for one or more modified random access requests, transmitting the one or more modified random access requests using the determined set of resources, and receiving a random access response from the base station responsive to the one or more modified random access requests.

An apparatus for wireless communication at a UE is described. The apparatus may include a processor, memory coupled with the processor, and instructions stored in the memory. The instructions may be executable by the processor to cause the apparatus to transmit an initial random access request to a base station to establish a wireless connection with the base station, receive a control channel order from the base station responsive to the initial random access request, determine, based on the control channel order, a set of resources for one or more modified random access requests, transmit the one or more modified random access requests using the determined set of resources, and receive a random access response from the base station responsive to the one or more modified random access requests.

Another apparatus for wireless communication at a UE is described. The apparatus may include means for transmitting an initial random access request to a base station to establish a wireless connection with the base station, receiving a control channel order from the base station responsive to the initial random access request, determining, based on the control channel order, a set of resources for one or more modified random access requests, transmitting the one or more modified random access requests using the determined set of resources, and receiving a random access response from the base station responsive to the one or more modified random access requests.

A non-transitory computer-readable medium storing code for wireless communication at a UE is described. The code may include instructions executable by a processor to transmit an initial random access request to a base station to establish a wireless connection with the base station, receive a control channel order from the base station responsive to the initial random access request, determine, based on the control channel order, a set of resources for one or more modified random access requests, transmit the one or more modified random access requests using the determined set of resources, and receive a random access response from the base station responsive to the one or more modified random access requests.

In some examples of the method, apparatuses, and non-transitory computer-readable medium described herein, the determining further may include operations, features, means, or instructions for identifying one or more parameters for the one or more modified random access requests based on a first random access occasion that has a same random access occasion configuration as the initial random access request. In some examples of the method, apparatuses, and non-transitory computer-readable medium described herein, the determining further may include operations, features, means, or instructions for identifying the set of resources in a subsequent random access occasion to the first random access occasion based on the control channel order, where the subsequent random access occasion is associated with a same synchronization signal block (SSB) as the first random access occasion. Some examples of the method, apparatuses, and non-transitory computer-readable medium described herein may further include operations, features, means, or instructions for selecting, from a first subset of preamble sequences associated with the first random access occasion, a first preamble sequence for the one or more modified random access requests, where the first subset of preamble sequences is non-overlapping with a second subset preamble sequences that are available for initial random access requests associated with the first random access occasion.

In some examples of the method, apparatuses, and non-transitory computer-readable medium described herein, the determining further may include operations, features, means, or instructions for identifying the set of resources for the one or more modified random access requests based on a second random access occasion configuration that is different than a first random access occasion configuration of the initial random access request. In some examples of the method, apparatuses, and non-transitory computer-readable medium described herein, the second random access occasion configuration is received in RRC signaling from the base station.

In some examples of the method, apparatuses, and non-transitory computer-readable medium described herein, the second random access occasion configuration includes configuration parameters for one or more of time resources of a second random access occasion, frequency resources of the second random access occasion, a number of repetitions of the modified random access request that may be to be transmitted, or any combinations thereof. In some examples of the method, apparatuses, and non-transitory computer-readable medium described herein, a set of periodic resources is provided for the one or more modified random access requests.

In some examples of the method, apparatuses, and non-transitory computer-readable medium described herein, the second random access occasion configuration is associated with a synchronization signal block (SSB) that was used to identify uplink resources for the initial random access request. In some examples of the method, apparatuses, and non-transitory computer-readable medium described herein, a set of different random access occasions for transmission of modified random access requests are configured for each of a set of different SSBs. In some examples of the method, apparatuses, and non-transitory computer-readable medium described herein, the second random access occasion configuration is unassociated with any synchronization signal block (SSB). In some examples of the method, apparatuses, and non-transitory computer-readable medium described herein, a set of different random access occasions for transmission of modified random access requests are shared by two or more different SSBs. In some examples of the method, apparatuses, and non-transitory computer-readable medium described herein, the determining further may include operations, features, means, or instructions for identifying the set of resources based on an indication provided by the control channel order.

Some examples of the method, apparatuses, and non-transitory computer-readable medium described herein may further include operations, features, means, or instructions for receiving, in RRC signaling, a set of parameters associated with a random access occasion for transmission of the one or more modified random access requests, and where the control channel order triggers transmission of the one or more modified random access requests in the random access occasion. In some examples of the method, apparatuses, and non-transitory computer-readable medium described herein, the RRC signaling provides one or more of time resources or frequency resources for the random access occasion, a number of repetitions for the one or more modified random access requests, or any combinations thereof. In some examples of the method, apparatuses, and non-transitory computer-readable medium described herein, the control channel order acts as an uplink grant for the one or more modified random access requests using the set of resources. In some examples of the method, apparatuses, and non-transitory computer-readable medium described herein, the set of resources may be determined based on a location of the control channel order. In some examples of the method, apparatuses, and non-transitory computer-readable medium described herein, a time domain location of the set of resources may be based on a time offset from the control channel order. In some examples of the method, apparatuses, and non-transitory computer-readable medium described herein, a time domain location of the set of resources may be based on a fixed time offset from the control channel order or a time offset indicated by one or more bits in the control channel order.

Some examples of the method, apparatuses, and non-transitory computer-readable medium described herein may further include operations, features, means, or instructions for determining a second preamble for the one or more modified random access requests as a function of a first random access occasion associated with the initial random access request, a first preamble of the initial random access request, or any combinations thereof. In some examples of the method, apparatuses, and non-transitory computer-readable medium described herein, the function may be further based on a control value provided in the control channel order. In some examples of the method, apparatuses, and non-transitory computer-readable medium described herein, the function outputs one or more of a frequency domain index for the one or more modified random access requests, a preamble index for the one or more modified random access requests, or any combinations thereof. In some examples of the method, apparatuses, and non-transitory computer-readable medium described herein, a same preamble may be used for each of two or more repetitions of the modified random access request, or a different preamble may be used for each of two or more repetitions of the modified random access request based on a hopping algorithm. In some examples of the method, apparatuses, and non-transitory computer-readable medium described herein, a starting random access occasion index associated with the set of resources may be determined based on a time domain location of the control channel order. In some examples of the method, apparatuses, and non-transitory computer-readable medium described herein, a starting time domain resource of the set of resources may be based on an initial time domain resource that corresponds to a synchronization signal block (SSB) index associated with the initial random access request and a fixed or signaled time domain offset from a second time domain resource of the control channel order.

Some examples of the method, apparatuses, and non-transitory computer-readable medium described herein may further include operations, features, means, or instructions for determining a second random access preamble for the one or more modified random access requests as a function of a first random access preamble used for the initial random access request. In some examples of the method, apparatuses, and non-transitory computer-readable medium described herein, the set of resources includes resources in a second random access occasion that are determined as a function of a first random access occasion associated with the initial random access request.

In some examples of the method, apparatuses, and non-transitory computer-readable medium described herein, the determining further may include operations, features, means, or instructions for selecting the set of resources from a configured number of available resources for transmission of the one or more modified random access requests, and where the selecting is based on one or more of a timing of the control channel order or an offset that is indicated by the control channel order. In some examples of the method, apparatuses, and non-transitory computer-readable medium described herein, the determining further may include operations, features, means, or instructions for identifying a configured set of parameters for a random access occasion associated with the one or more modified random access requests, and determining a location of the set of resources based on the configured set of parameters and one or more of a timing of the control channel order or an offset that is indicated by the control channel order.

A method of wireless communication at a base station is described. The method may include receiving, from a UE, an initial random access request to establish a wireless connection with the base station, transmitting a control channel order to the UE responsive to the initial random access request, determining, based on the control channel order, a set of resources for one or more modified random access requests, monitoring for the one or more modified random access requests using the determined set of resources, and transmitting a random access response to the UE using one or more beamforming parameters that are based on measurements associated with the one or more modified random access requests.

An apparatus for wireless communication at a base station is described. The apparatus may include a processor, memory coupled with the processor, and instructions stored in the memory. The instructions may be executable by the processor to cause the apparatus to receive, from a UE, an initial random access request to establish a wireless connection with the base station, transmit a control channel order to the UE responsive to the initial random access request, determine, based on the control channel order, a set of resources for one or more modified random access requests, monitor for the one or more modified random access requests using the determined set of resources, and transmit a random access response to the UE using one or more beamforming parameters that are based on measurements associated with the one or more modified random access requests.

Another apparatus for wireless communication at a base station is described. The apparatus may include means for receiving, from a UE, an initial random access request to establish a wireless connection with the base station, transmitting a control channel order to the UE responsive to the initial random access request, determining, based on the control channel order, a set of resources for one or more modified random access requests, monitoring for the one or more modified random access requests using the determined set of resources, and transmitting a random access response to the UE using one or more beamforming parameters that are based on measurements associated with the one or more modified random access requests.

A non-transitory computer-readable medium storing code for wireless communication at a base station is described. The code may include instructions executable by a processor to receive, from a UE, an initial random access request to establish a wireless connection with the base station, transmit a control channel order to the UE responsive to the initial random access request, determine, based on the control channel order, a set of resources for one or more modified random access requests, monitor for the one or more modified random access requests using the determined set of resources, and transmit a random access response to the UE using one or more beamforming parameters that are based on measurements associated with the one or more modified random access requests.

In some examples of the method, apparatuses, and non-transitory computer-readable medium described herein, the determining further may include operations, features, means, or instructions for identifying one or more parameters for the one or more modified random access requests based on a first random access occasion that has a same random access occasion configuration as the initial random access request. In some examples of the method, apparatuses, and non-transitory computer-readable medium described herein, the determining further may include operations, features, means, or instructions for identifying the set of resources in a subsequent random access occasion to the first random access occasion based on the control channel order, where the subsequent random access occasion is associated with a same synchronization signal block (SSB) as the first random access occasion. In some examples of the method, apparatuses, and non-transitory computer-readable medium described herein, a first subset of preamble sequences of the first random access occasion is associated with initial random access request messages, and a second subset of preamble sequences of the first random access occasion is associated with modified random access messages, where the first subset of preamble sequences is non-overlapping with the second subset preamble sequences.

In some examples of the method, apparatuses, and non-transitory computer-readable medium described herein, the determining further may include operations, features, means, or instructions for identifying the set of resources for the one or more modified random access requests based on a second random access occasion configuration that is different than a first random access occasion configuration of the initial random access request. Some examples of the method, apparatuses, and non-transitory computer-readable medium described herein may further include operations, features, means, or instructions for transmitting the second random access occasion configuration to the UE in RRC signaling. In some examples of the method, apparatuses, and non-transitory computer-readable medium described herein, the second random access occasion configuration includes parameters for one or more of time resources of a second random access occasion, frequency resources of the second random access occasion, a number of repetitions of the modified random access request that are to be transmitted, or any combinations thereof. In some examples of the method, apparatuses, and non-transitory computer-readable medium described herein, a set of periodic resources may be provided for the one or more modified random access requests.

In some examples of the method, apparatuses, and non-transitory computer-readable medium described herein, the second random access occasion configuration may be associated with a synchronization signal block (SSB) used to identify uplink resources for the initial random access request. In some examples of the method, apparatuses, and non-transitory computer-readable medium described herein, a set of different random access occasions for transmission of modified random access requests may be configured for each of a plurality of different SSBs. In some examples of the method, apparatuses, and non-transitory computer-readable medium described herein, the second random access occasion configuration may be unassociated with any synchronization signal block (SSB). In some examples of the method, apparatuses, and non-transitory computer-readable medium described herein, a set of different random access occasions for transmission of modified random access requests is shared by two or more different SSBs. Some examples of the method, apparatuses, and non-transitory computer-readable medium described herein may further include operations, features, means, or instructions for providing an indication to the UE in the control channel order that identifies the set of resources.

Some examples of the method, apparatuses, and non-transitory computer-readable medium described herein may further include operations, features, means, or instructions for transmitting, in RRC signaling, a set of parameters associated with a random access occasion for transmission of the one or more modified random access requests, and where the control channel order triggers transmission of the one or more modified random access requests in the random access occasion. In some examples of the method, apparatuses, and non-transitory computer-readable medium described herein, the RRC signaling provides one or more of time resources or frequency resources for the random access occasion, a number of repetitions for the one or more modified random access requests, or any combinations thereof. In some examples of the method, apparatuses, and non-transitory computer-readable medium described herein, the control channel order acts as an uplink grant for the one or more modified random access requests using the set of resources.

In some examples of the method, apparatuses, and non-transitory computer-readable medium described herein, the set of resources may be determined based on a location of the control channel order. In some examples of the method, apparatuses, and non-transitory computer-readable medium described herein, a time domain location of the set of resources may be based on a time offset from the control channel order. In some examples of the method, apparatuses, and non-transitory computer-readable medium described herein, a time domain location of the set of resources may be based on a fixed time offset from the control channel order or a time offset indicated by one or more bits in the control channel order.

Some examples of the method, apparatuses, and non-transitory computer-readable medium described herein may further include operations, features, means, or instructions for determining that the one or more modified random access requests are associated with the UE based on the one or more modified random access requests having a preamble that is a function of a first random access occasion associated with the initial random access request, a first preamble of the initial random access request, or any combinations thereof. In some examples of the method, apparatuses, and non-transitory computer-readable medium described herein, the function may be further based on a control value provided in the control channel order. In some examples of the method, apparatuses, and non-transitory computer-readable medium described herein, the function outputs one or more of a frequency domain index for the one or more modified random access requests, a preamble index for the one or more modified random access requests, or any combinations thereof. In some examples of the method, apparatuses, and non-transitory computer-readable medium described herein, a same preamble may be used for each of two or more repetitions of the modified random access request, or a different preamble may be used for each of two or more repetitions of the modified random access request based on a hopping algorithm.

In some examples of the method, apparatuses, and non-transitory computer-readable medium described herein, a starting random access occasion index associated with the set of resources may be determined based on a time domain location of the control channel order. In some examples of the method, apparatuses, and non-transitory computer-readable medium described herein, a starting time domain resource of the set of resources may be based on an initial time domain resource that corresponds to a synchronization signal block (SSB) index associated with the initial random access request and a fixed or signaled time domain offset from a second time domain resource of the control channel order.

In some examples of the method, apparatuses, and non-transitory computer-readable medium described herein, a second random access preamble for the one or more modified random access requests may be a function of a first random access preamble used for the initial random access request. In some examples of the method, apparatuses, and non-transitory computer-readable medium described herein, the set of resources includes resources in a second random access occasion that may be determined as a function of a first random access occasion associated with the initial random access request.

Some examples of the method, apparatuses, and non-transitory computer-readable medium described herein may further include operations, features, means, or instructions for configuring the UE with a number of available resources for transmission of the one or more modified random access requests, and where the set of resources is selected from the number of available resources based on one or more of a timing of the control channel order or an offset that is indicated by the control channel order. Some examples of the method, apparatuses, and non-transitory computer-readable medium described herein may further include operations, features, means, or instructions for configuring a set of parameters for a random access occasion associated with the one or more modified random access requests, and where a location of the set of resources is based on the configured set of parameters and one or more of a timing of the control channel order or an offset that is indicated by the control channel order.

DETAILED DESCRIPTION

Figure 1:
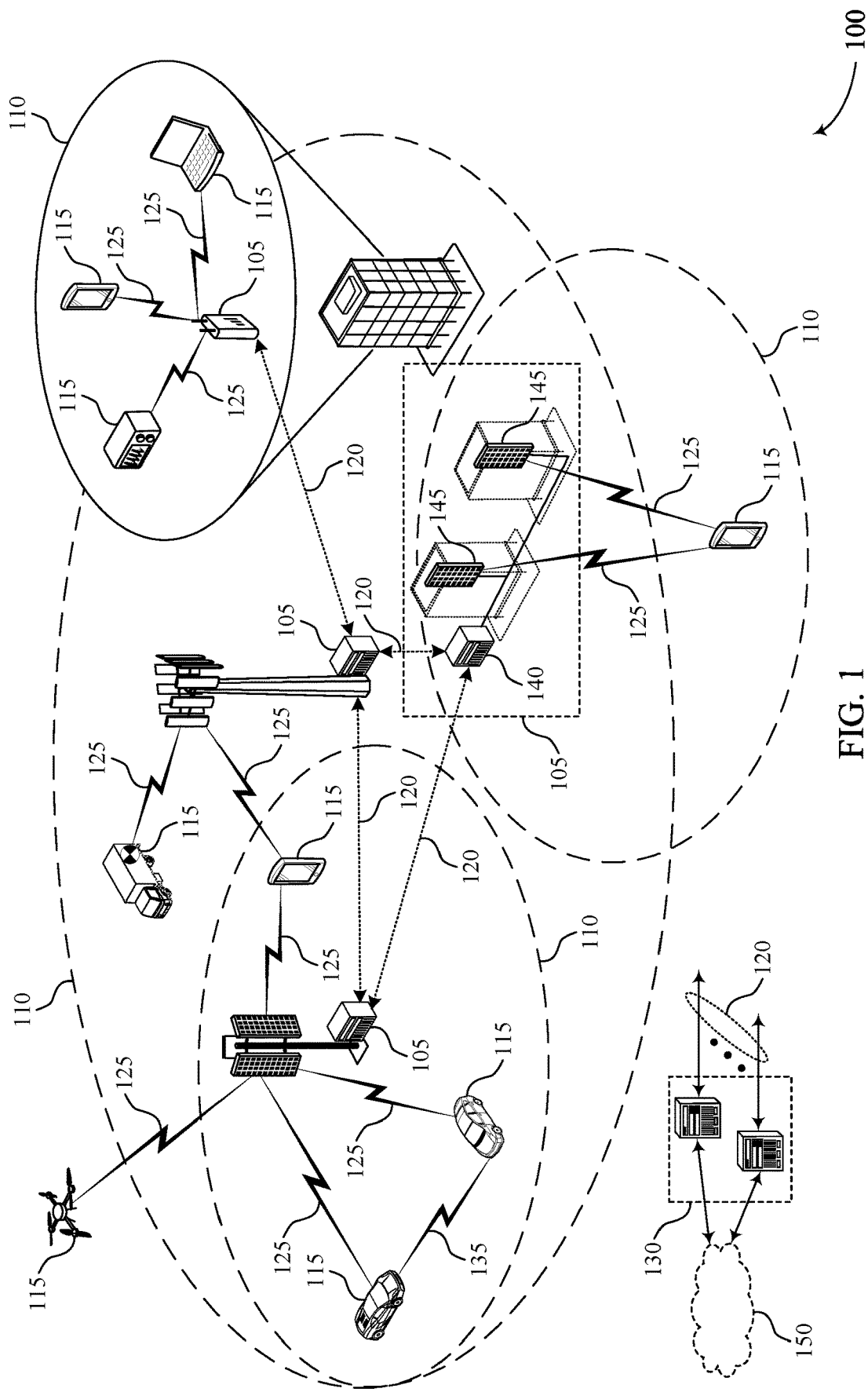
FIG. 1 illustrates an example of a system for wireless communications that supports beam refinement techniques for random access communications in accordance with aspects of the present disclosure.

Various described techniques provide for refinement of beamforming parameters as part of a random access procedure. In some cases, a base station and a user equipment (UE) may use multiple transmissions associated with an access procedure (e.g., a random access procedure for initial access between the UE and base station) to refine a beam that is used for subsequent portions of the access procedure. In some cases, the UE may transmit a random access request to the base station and, in response thereto, the base station may transmit a physical downlink control channel (PDCCH) order to the UE. The PDCCH order may indicate that the UE is to transmit one or more modified random access requests to the base station. Resources and parameters for the one or more modified random access requests may be identified based on techniques such as discussed herein. The base station may monitor for the one or more modified random access requests using different beamforming parameters in order to determine a refined beam to be used for a subsequent transmission in the random access procedure. The base station may then use the refined beam to transmit a random access response to the UE, and complete the access procedure.

In some cases, such techniques may be used in millimeter wave (mmW) systems where a base station and UE may communicate via one or more directional beams, and a base station may engage in a beam sweeping operation when transmitting synchronization signal blocks (SSBs) that are detected at UEs and used to identify random access resources for an initial access procedure and establish an active transmit beam for communications. In some cases, the base station, as part of the beam sweep procedure, may perform a sector sweep with wide-formed, lower gain beams that may be transmitted to a particular sector or geographic area in a SSB, and then a subsequent beam may be transmitted to another sector or geographic area in a subsequent SSB. In some cases, each SSB has associated uplink resources, and a UE may transmit an uplink transmission, such as a random access request using a random access channel (RACH) in the uplink resources associated with the SSB in which the UE received the strongest downlink beam. Thus, the different uplink resources associated with different beams in a beam sweeping procedure may provide a time resource partition, and the UE transmission in a particular uplink resource may provide feedback to the base station of the wide-formed beam that the UE received with the highest gain, for example.

In some existing systems, initial access procedures such as RACH procedures may provide that a UE acquires a cell by reading SSB and a system information block (e.g., SIB1), where the system information block provides initial access related parameters. The UE may then transmit a random access request, which may be referred to as a message-1 or MSG1. In some cases, the RACH procedure may use open-loop power control in which the UE may transmit MSG1 at an initial power level and monitor for a response, and then incrementally increase the power level in one or more subsequent transmissions of MSG1 until a random access response is detected from the base station. The base station, upon detection of MSG1, transmits a random access response, which may be referred to as message-2 or MSG2, which may include PDCCH and physical downlink shared channel (PDSCH) portions. In some cases, the PDCCH may be scrambled with random access radio network temporary identifier (RA-RNTI) which is a function of the random access occasion (RO) that the UE used to send MSG1 (e.g., based on a best detected SSB at the UE). Within the PDSCH portion, a medium access control (MAC) control element (CE) may acknowledge the reception of MSG1 and grant the UE an uplink grant to send a message-3 (MSG3) that may include a UE identification. The UE may monitor for PDCCH communications (e.g., downlink control formation (DCI) format 1_0) that are scrambled with the RA-RNTI that corresponds to the RO the UE used to transmit MSG1 and, if detected, proceed with PDSCH decoding. If the MAC-CE is found in the PDSCH, adding to a random access preamble the UE used to send MSG1, the UE will treat this MAC-CE as for itself and follow the UL grant to send its UE-ID in MSG3. In the event of a collision from multiple UEs (e.g., if they used the same preamble sequence in the same RO for sending MSG1) that each send the MSG3 at the same resource, the base station may identify the collision and perform contention resolution, followed by a transmission of an uplink grant in a message-4 (MSG4) from the base station.

In cases where communications use mmW frequencies, the SSB, as indicated above, may be transmitted with a relatively wide beam (e.g., given a limitation of 64 beams supportable in a cell), while a final serving beam to a UE can be narrower with a higher beamforming gain. In some systems, the bottleneck of the initial access process may be related to the random access response (MSG2) transmission, where the UE may not detect the MSG2 transmission from the base station, which may result in inefficiencies due to the UE continuing to transmit higher-power MSG1 transmissions or attempting a new initial access procedure altogether. Such a bottleneck related to MSG2 may result from the base station using the same transmit beam for MSG2 as was used for the associated SSB, which may have relatively low beamforming gain. Further, MSG2 transmissions do not have acknowledgment feedback (e.g., hybrid automatic repeat request (HARQ) feedback) to indicate to the base station whether the transmission was successfully received or not, and thus the base station may not be aware that the UE did not receive MSG2.

In some cases, UEs may transmit one or more additional signals as part of the random access process, which may be measured at the base station using different receive beamforming parameters in order to refine a beam that is used to transmit MSG2. In some cases, the base station may transmit a PDCCH order in response to receiving a random access request, which may trigger the UE to transmit one or more modified random access requests using a same transmission beam, which may allow the base station to perform beam refinement. Given beam correspondence, the refined receive beam may be used as refined transmit beam for MSG2 transmission. By using a PDCCH order, the UE does not unnecessarily transmit the modified random access request(s), and thus resources can be conserved. Further, such a PDCCH order may have a higher likelihood of reception at the UE than a regular MSG2 transmission, as the order may have a relatively small payload and may thus have a relatively large coding gain as compared to a regular MSG2, which can compensate for a relatively low beamforming gain.

In some cases, the PDCCH order may be monitored for by the UE, in addition to monitoring for a MSG2. The PDCCH order may be scrambled by a RA-RNTI that may be monitored for by the UE, in a similar manner as a MSG2 PDCCH, and the PDCCH order may carry the preamble index to confirm which UE should follow. In some cases, the PDCCH order may indicate a resource for a beam refinement signal transmission, or multiple resources for multiple beam refinement signal transmissions. In some cases, multiple rounds of PDCCH order and beam refinement signals can be supported. As used herein, a PDCCH order may be referred to as a control channel order, a compressed PDCCH order, or a MSG2', and the beam refinement signal maybe referred to as a modified random access request or MSG1'.

In some cases, random access occasions (ROs) for transmission of the initial random access request and the modified random access request(s) may each be associated with a same SSB. In some cases, a first subset of random access preambles of a RO may be used for the initial random access requests, and a second subset of random access preambles or the RO may be used for modified random access requests, and an initial versus modified random access request may be differentiated based on the associated preamble sequence. In some cases, a separate set of ROs may be configured for modified random access requests that is separate from an initial set of ROs for initial random access requests. In some cases, ROs for modified random access requests may be unassociated with a particular SSB, and such ROs may be identified based on one or more configured parameters, which may be triggered by the PDCCH order.

Providing such beam refinement during an access procedure may provide for more reliable network access procedures. For example, beam refinement based on one or more modified random access requests, in response to a PDCCH order, may enhance likelihood of reception of the random access response at the UE. Such techniques may thus allow for more efficient and reliable access, and thereby enhance the reliability and efficiency of the associated wireless communications network. Further, techniques as discussed herein may reduce a number of downlink and uplink transmissions, and thereby reduce power consumption at a UE, for example. Additionally, in cases where mmW transmissions use a shared or unlicensed frequency spectrum band, a reduced number of transmissions between a UE and a base station is beneficial because it reduces the likelihood that an access procedure will be interrupted in the event that a different transmitter obtains the wireless channel.

Aspects of the disclosure are initially described in the context of wireless communications systems. Examples of uplink and downlink communications, and modified access requests with associated resources, are then discussed. Aspects of the disclosure are further illustrated by and described with reference to apparatus diagrams, system diagrams, and flowcharts that relate to beam refinement techniques for random access communications.

FIG. 1 illustrates an example of a wireless communications system 100 that supports beam refinement techniques for random access communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, in accordance with various techniques as discussed herein, when performing an initial access procedure, a base station 105 and a UE 115 may use multiple transmissions to refine a beam that is used for subsequent portions of the access procedure. In some cases, a UE 115 may transmit an initial random access request to a base station 105 and, in response thereto, the base station 105 may transmit a PDCCH order to the UE 115. The PDCCH order may indicate that the UE 115 is to transmit one or more modified random access requests to the base station 105.

In some cases, ROs for transmission of the initial random access request and the modified random access request(s) may each be associated with a same SSB. In some cases, a first subset of preambles may be used for the initial random access requests, and a second subset of preambles may be used for modified random access requests, and an initial versus modified random access request may be differentiated based on the associated preamble sequence. In some cases, a separate set of ROs may be configured for modified random access requests that is separate from an initial set of ROs for initial random access requests. In some cases, ROs for modified random access requests may be unassociated with a particular SSB, and such ROs may be identified based on one or more configured parameters, which may be triggered by the PDCCH order.

The base station 105 may monitor for the one or more modified random access requests using different beamforming parameters in order to determine a refined beam to be used for a subsequent transmission in the random access procedure. The base station 105 may then use the refined beam to transmit a random access response to the UE 115, and complete the access procedure. The refined beam may provide for more reliable reception of the random access response at the UE 115, and thereby enhance the reliability and efficiency of communications.

Figure 2:
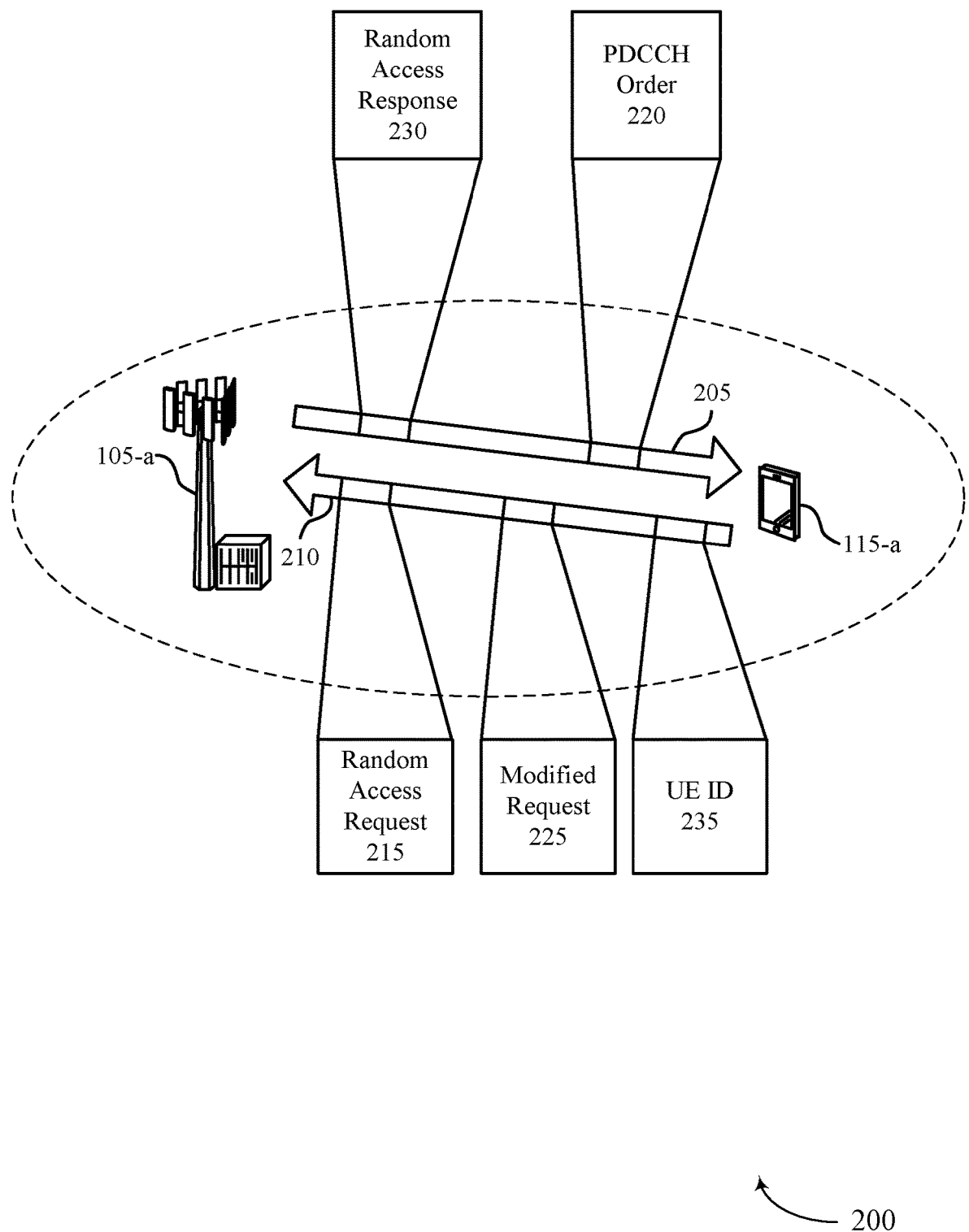
FIG. 2 illustrates an example of a portion of a wireless communications system that supports beam refinement techniques for random access communications in accordance with aspects of the present disclosure.

FIG. 2 illustrates an example of a wireless communications system 200 that supports beam refinement techniques for random access communications in accordance with aspects of the present disclosure. In some examples, wireless communications system 200 may implement aspects of wireless communications system 100. Wireless communications system 200 may include a base station 105-*a* and a UE 115-*a*, which may be examples of the corresponding devices described with reference to FIG. 1. Base station 105-*a* and UE 115-*a* may communicate using one or more directional beams. In wireless communications system 200, a transmitter (e.g., base station 105-*a*) may engage in a beam sweeping operation to establish an active beam pair link with a receiver (e.g., UE 115-*a*) that may be used for downlink communications 205 and uplink communications 210.

In some examples, base station 105-*a* may engage in a beam sweeping operation to establish an active transmit beam with UE 115-*a*. For example, base station 105-*a* may transmit relatively wide-formed beams, that may be transmitted towards different sectors or geographic directions. In some cases, each wide-formed beam may be associated with an SSB in which synchronization signals (e.g., a primary synchronization signal (PSS) and a secondary synchronization signal (SSS)) and physical broadcast channel (PBCH) transmissions may be transmitted in the corresponding beam direction. In some cases, wide-formed beams may not be narrow enough or have enough beamforming gain to provide for reliable communications between the UE 115-*a* and base station 105-*a*, and using such a relatively wide beam for a random access response may not result in a reliably successful reception at the UE 115-*a*. Therefore, it may be beneficial for base station 105-*a* and UE 115-*a* to use beam refinement to generate a narrower beamformed signal that may be used to communicate a random access response, which may have a narrower coverage area but higher gain.

In some cases, the SSB may indicate an uplink transmission resource that UE 115-*a* may use for a random access transmission (e.g., an uplink RO resource associated with an SSB). In some cases, the base station 105-*a* may provide other information (e.g., a subset of RACH resources and/or preamble indices) that may be configured by a set of parameters in a master information block (MIB), system information block (SIB), remaining minimum system information (RMSI), or combinations thereof. In some cases, the random access transmission may be a random access request 215 (e.g., a RACH message-1 (MSG1)) that may indicate that the UE 115-a has uplink data to transmit or that the UE 115-a desires to establish a connection with the base station 105-a.

The base station 105-a may receive the random access request 215 and determine to transmit a PDCCH order 220, which may be an example of a control channel order or a MSG2' as discussed herein. In some cases, the PDCCH order 220 is a compressed PDCCH order relative to PDCCH orders that may be used in existing deployments (e.g., used to trigger a connected mode UE to send a random access request for a handoff or for timing advance recovery (i.e., based on a DCI 1_0 scrambled with C-RNTI (identified by all 0 FDRA))). Such existing PDCCH orders may have redundant fields to allow alignment with a normal DCI 1_0 to avoid the UE decoding a different DCI length.

In some cases, ROs for transmission of the random access request 215 may be associated with a particular SSB, such that the UE 115-a that determines the particular SSB is a preferable SSB can use the associated RO to transmit the random access request 215. Based on reception of the PDCCH order 220, the UE 115-a may then transmit the one or more modified requests 225, which may be an example of a beam refinement signal or a MSG1' as discussed herein. In some cases, a set of resources, parameters, or combinations thereof, may be used to transmit the one or more modified requests 225. In some cases, a same RO that is associated with a selected SSB may be used for both the random access request 215 and the modified request 225. In such cases, a first subset of preambles may be used for random access requests 215, and a second subset of preambles may be used for modified requests 225, and an initial versus modified random access request may be differentiated based on the associated preamble sequence. In some cases, a separate set of ROs may be configured for the modified requests 225 that is separate from an initial set of ROs for random access requests 215. In some cases, ROs for modified requests 225 may be unassociated with a particular SSB, and such ROs may be identified based on one or more configured parameters, which may be triggered by the PDCCH order 220 (i.e., the exact location of the RO is determined based on the PDCCH order 220). In accordance with various aspects of the present disclosure, techniques for providing resources and/or preambles for the modified requests are discussed. Further, techniques for avoiding resource collisions (e.g., when multiple UEs are mapped to the same resource and same preamble sequence for MSG1' transmission) and for avoiding beam collisions (e.g., when multiple UEs using different beams are mapped to the same time domain resource for MSG1' transmissions such that the base station 105-a cannot receive them at the same time).

The base station 105-a, after transmitting the PDCCH order 220, may monitor for the modified request 225 at the identified uplink resources, using one or more relatively narrow beams that are narrower than a beam associated with the SSB, and identify a refined beam based on the monitoring. The refined beam may then be used by the base station 105-a to transmit the random access response 230 to the UE 115-a. As the random access response 230 is transmitted using the refined beam, the UE 115-a thus has a higher likelihood of successfully receiving the random access response 230. Accordingly, such techniques may enhance network efficiency and reliability by providing faster and more reliable initial access procedures. The UE 115-a, after decoding the random access response 230, may transmit a UE identification 235 in a MSG3 transmission, and the random access procedure may proceed in accordance with established random access techniques to complete a connection establishment between the UE 115-a and the base station 105-a.

Figure 3:
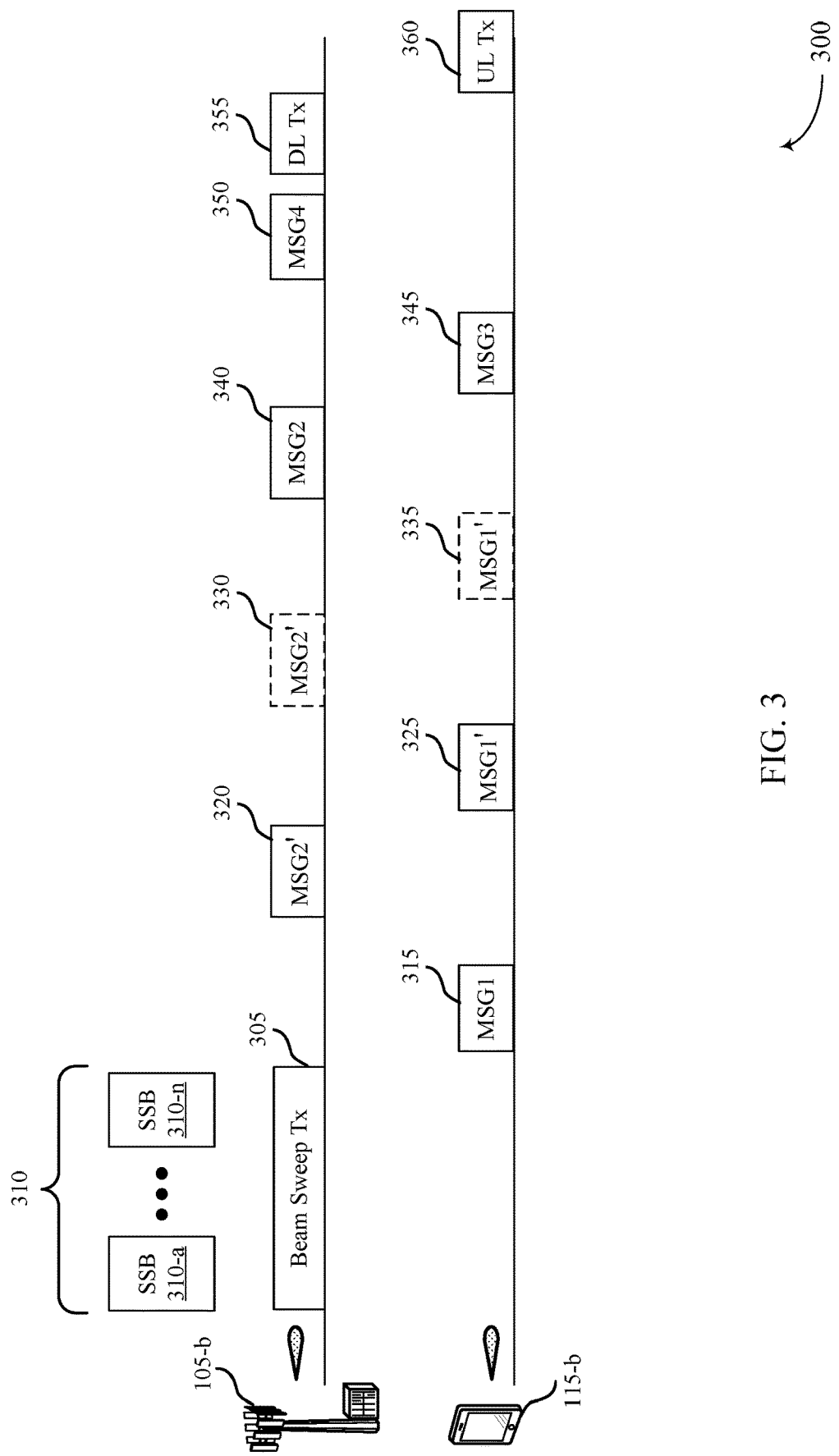
FIG. 3 illustrates an example of uplink and downlink transmissions that support beam refinement techniques for random access communications in accordance with aspects of the present disclosure.
Figure 4:
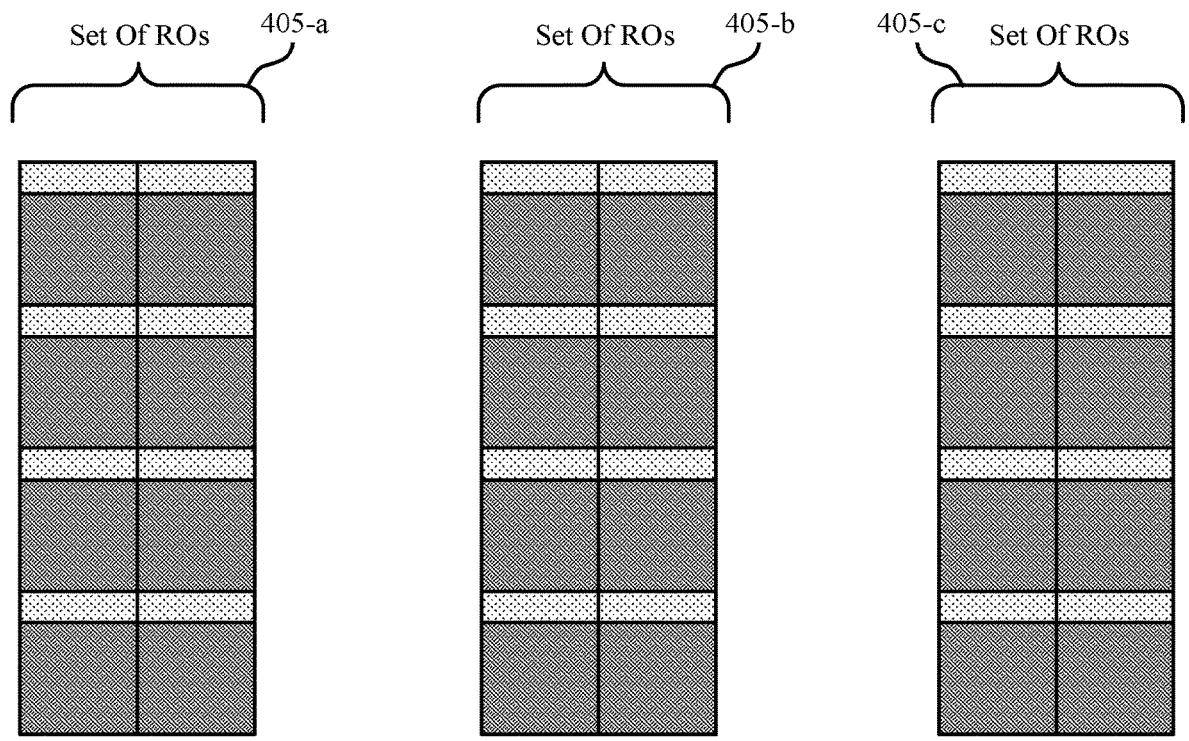
FIGS. 4 through 6 illustrate examples of random access occasions that support beam refinement techniques for random access communications in accordance with aspects of the present disclosure.
Figure 4:
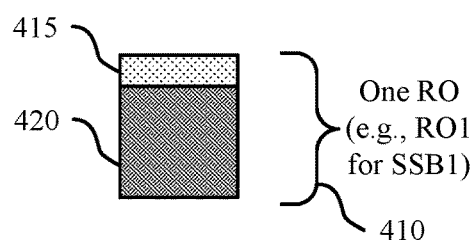
Figure 4:
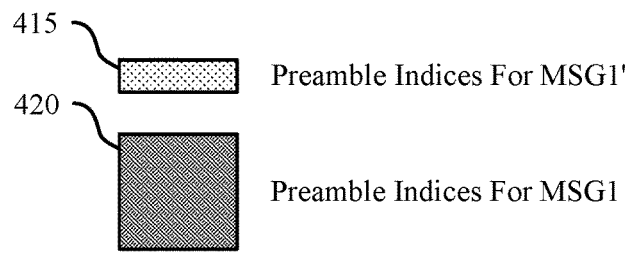

FIG. 3 illustrates an example of a uplink and downlink transmissions 300 that supports beam refinement techniques for random access communications in accordance with aspects of the present disclosure. In some examples, uplink and downlink transmissions 300 may implement aspects of wireless communications system 100 or 200. In this example, a base station 105-b, which may be an example of a base station 105 of FIG. 1 or 2, may transmit multiple wide beam downlink transmissions in a beam sweep operation 305 that may be detected at UE 115-b. In some cases, each wide beam may be transmitted in an SSB 310. In the example of FIG. 4, a first SSB 310-a may be an SSB for a first beam, and so on until an n-th SSB 310-n for an n-th beam.

In some cases, the base station 105-b, within each SSB 310, may transmit synchronization information in the form of a primary synchronization signal (PSS), a secondary synchronization signal (SSS), and a physical broadcast channel (PBCH) transmission. In some cases, each SSB 310 may have an associated uplink transmission resource 315 (e.g., first RACH resources), and a random access request received in a particular RACH resource may indicate the associated SSB 310 that was selected by the UE 115-b. The UE 115-b in this example may monitor received signals during the beam sweep operation 305 and determine that the first SSB 310-a has a higher gain (e.g., a higher RSRP) than other of the SSBs 310, and may determine the associated first RACH resource for transmission of MSG1 315. In some examples, as discussed herein, the first SSB may have different subsets of RACH resources, where a first subset of the RACH resources may be used to indicate that the UE 115-b supports beam refinement in random access, and a second subset of the RACH resources may be used to indicate that the UE 115-b does not support beam refinement in random access or does not need such beam refinement (e.g., when a signal quality of signals from the first SSB 310-a are above a threshold value). In other cases, as discussed herein, different random access preambles for MSG1 315 may be selected to provide such an indication of beam refinement capability.

The base station 105-b may receive MSG1 315 and determine to transmit a PDCCH order in MSG2' 320 to trigger the UE 115-b to then transmit a modified random access request in MSG1' 325. The base station 105-b may monitor for the MSG1' 325 transmission using beamforming parameters associated with one or more refined beams in order to determine a refined beam to be used for subsequent random access communications. In some cases, resources or preambles used for MSG1' 325 transmissions may be determined in accordance with various aspects of the present disclosure, and such a resource may be referred to as a RO'. Optionally, the base station 105-b may transmit a second PDCCH order in MSG2' 330 to trigger a second MSG1' 335 that may be used for further beam refinement, and such a process may continue for one or more further PDCCH orders are responsive transmissions. The base station 105-b may perform beam refinement procedures when monitoring for the MSG1' transmission(s), such as by using multiple receive beam parameters to determine the refined beam. The base station 105-b may use the refined beam to transmit MSG2 340. The UE 115-b may receive the MSG2 340 and transmit MSG3 345, which may be followed by a MSG4 350 from the base station 105-*b*, and downlink transmissions 355 and uplink transmissions 360.

FIG. 4 illustrates an example of random access occasions 400 that support beam refinement techniques for random access communications in accordance with aspects of the present disclosure. In some examples, random access occasions 400 may be implemented in aspects of wireless communications system 100 or 200. In this example, a UE (e.g., a UE 115 of FIG. 1, 2, or 3) may transmit a random access request or a MSG1, and receive a control channel order or a MSG2' in response thereto, that indicates that the UE is to transmit a modified random access request or MSG1' that may be used as a beam refinement signal at the base station.

In some cases, the resources used for both the MSG1 and MSG1' transmissions may be selected from a set of ROs 405 that are established for random access requests from UEs. As discussed herein, SSBs may have associated ROs that are used for random access requests, and each set of ROs 405 may have a number of different individual ROs 410 that are associated with a particular SSB. Sets of ROs 405 may be configured in periodic resources by a base station, and indicated to UEs (e.g., in a MIB, SIB, PBCH, RMSI, etc.). In the example of FIG. 4, MSG1 and MSG1' transmissions associated with a selected SSB may share the same ROs 410. In such cases, in response to receiving MSG2' the UE may transmit MSG1' in the next one or more ROs 410 that correspond to the same SSB as the original MSG1 transmission.

Figure 6:
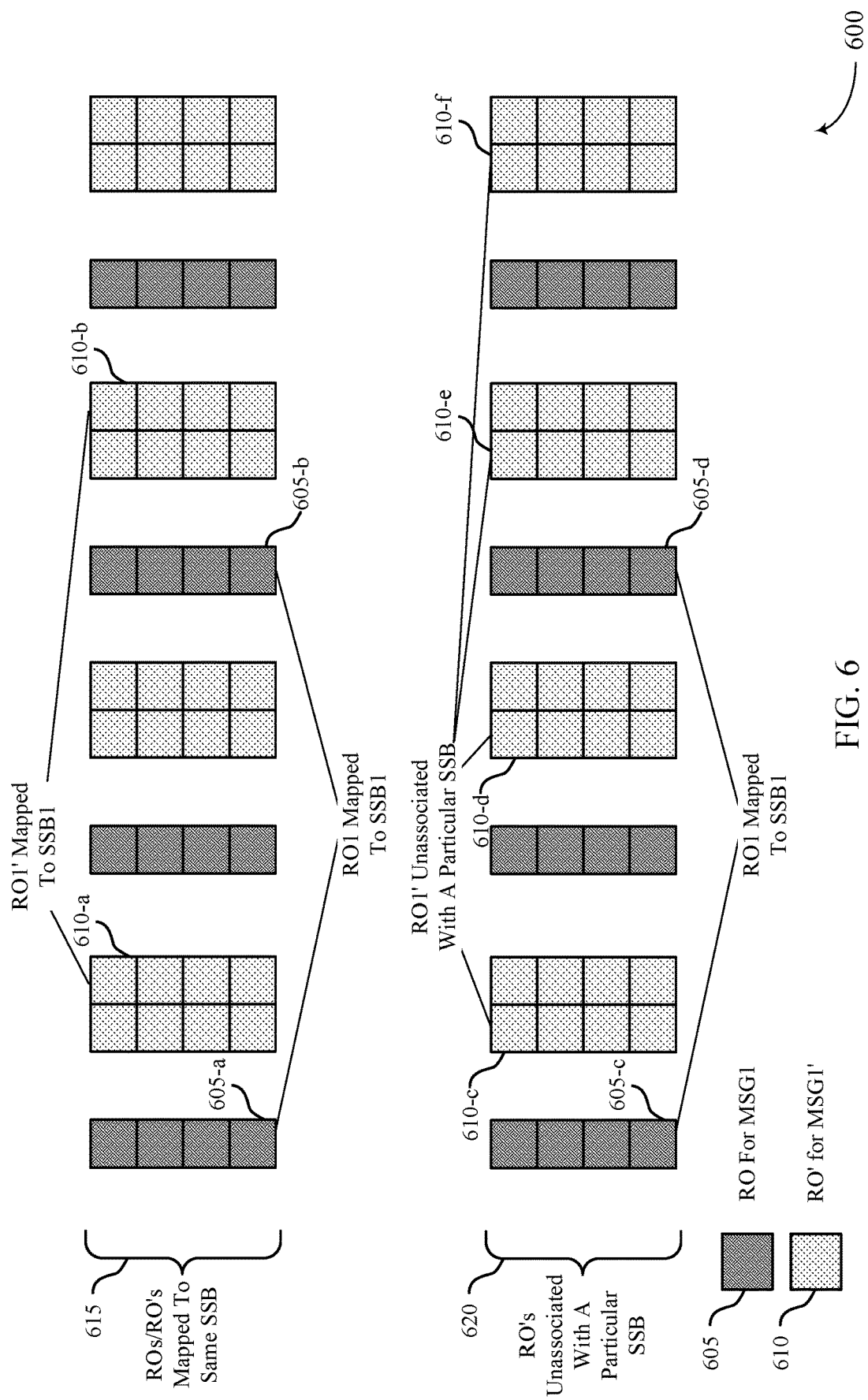
Figure 7:
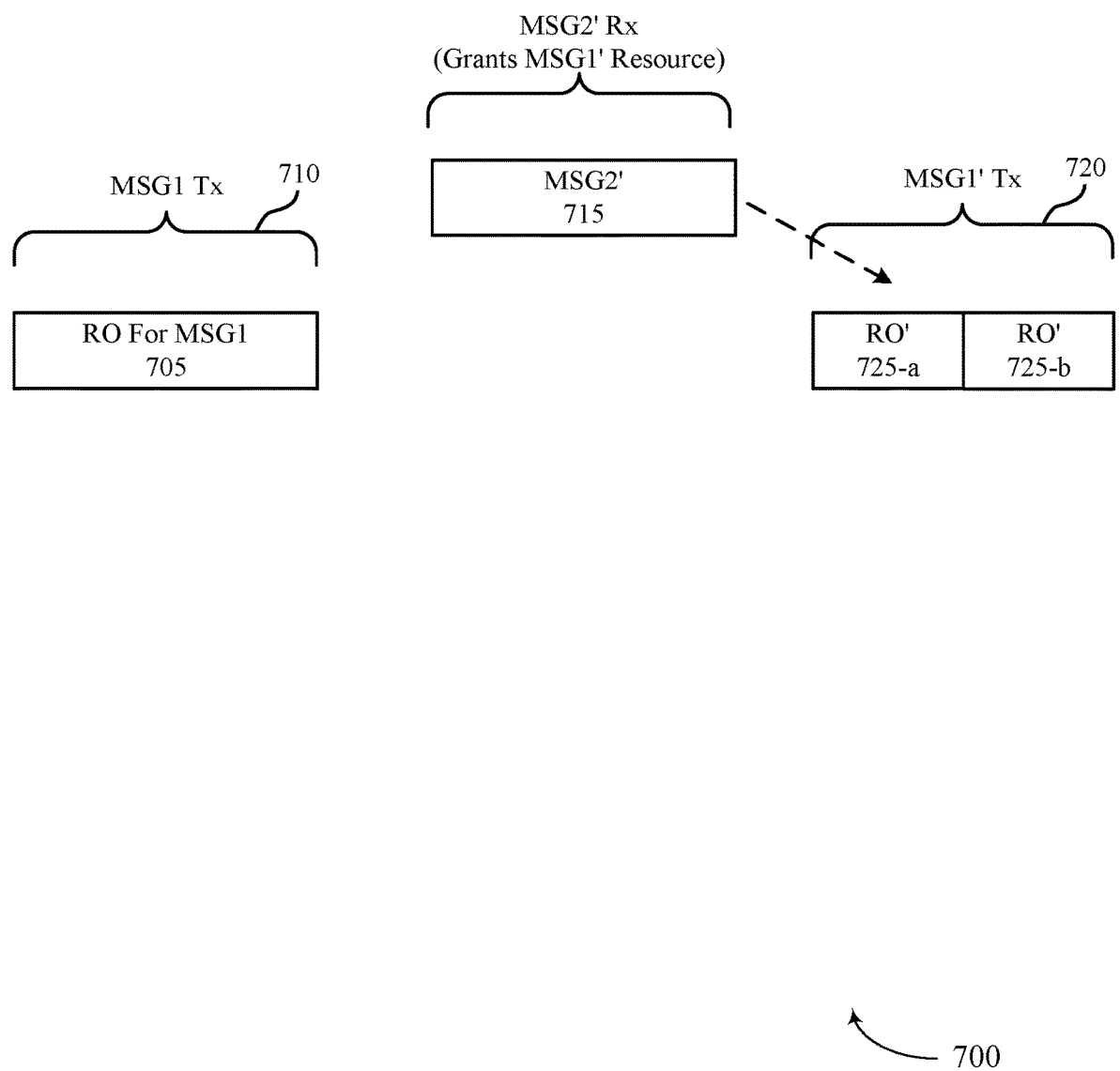
FIG. 7 illustrates an example of a triggered random access occasion for modified random access requests that supports beam refinement techniques for random access communications in accordance with aspects of the present disclosure.

In this example, the MSG1 and MSG1' transmission from different UEs may be separated by providing different subsets of preamble sequences for MSG1 and MSG1' transmissions in the same RO 410. In this example, a first subset of preamble indices 420 may be provided for MSG1 transmissions, and a second set of preamble indices 415 may be provided for MSG1' transmissions. Such a technique may use relatively few system resources, but may reduce a number of preamble sequences available for MSG1 transmissions and also result in a relatively long time period for transmission of the beam refinement signals as the ROs 410 for a same SSB may be spaced apart in the random access configuration. Further, in cases where multiple repetitions of MSG1' are transmitted, such a time may be extended in order to provide multiple copies of the message. Such common resources for MSG1 and MSG1' transmissions time durations may be desirable in various deployments in which separate system resources for MSG1' may not be available or are not desired to be configured. In other cases, such as illustrated in FIGS. 5 through 7, different resources (referred to as RO's) may be configured that are separate from the RO resources configured for random access.

Figure 5:
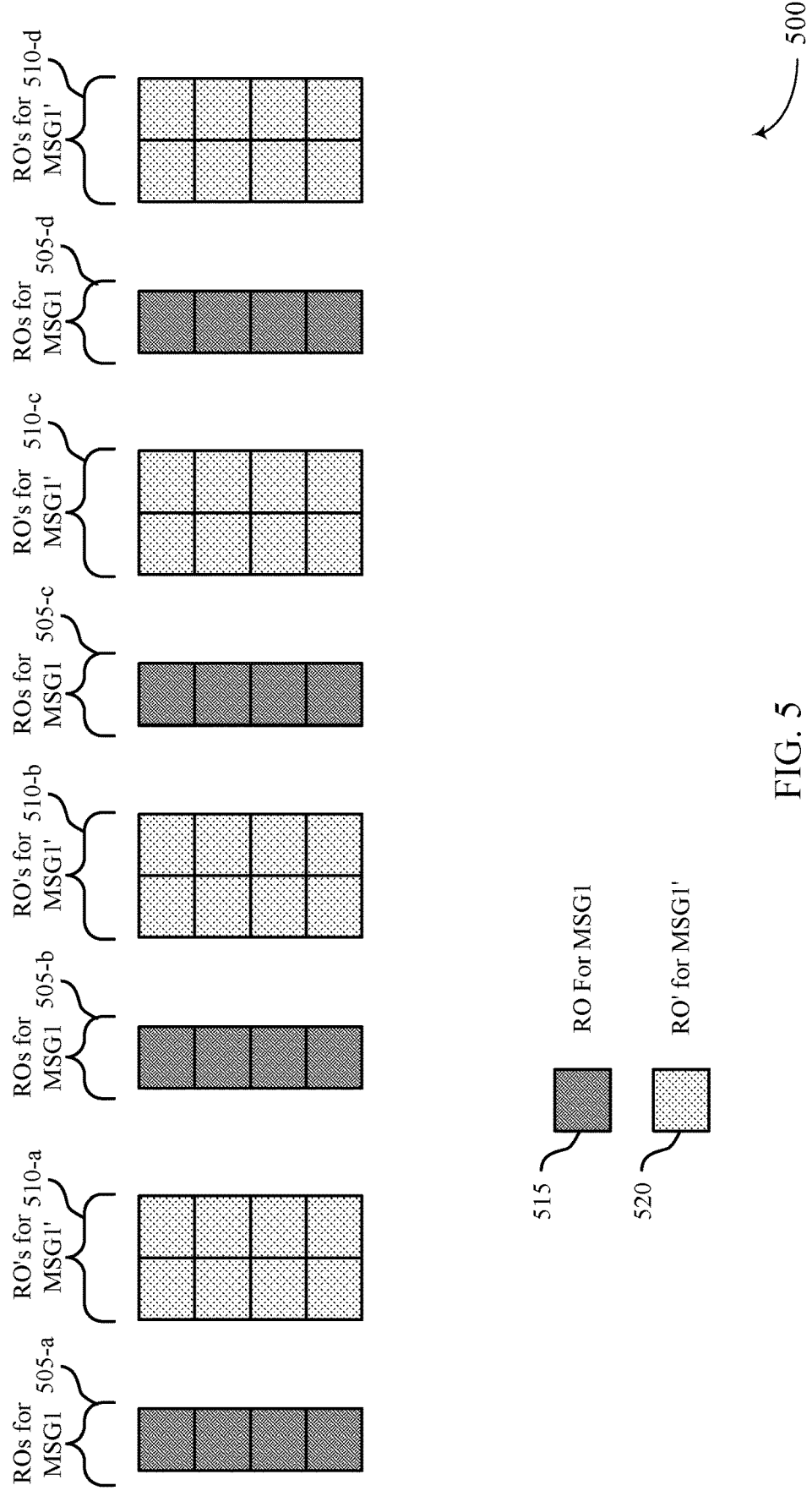

FIG. 5 illustrates an example of random access occasions 500 that support beam refinement techniques for random access communications in accordance with aspects of the present disclosure. In some examples, random access occasions 500 may be implemented in aspects of wireless communications system 100 or 200. In this example, a UE (e.g., a UE 115 of FIG. 1, 2, or 3) may transmit a random access request or a MSG1, and receive a control channel order or a MSG2' in response thereto, that indicates that the UE is to transmit a modified random access request or MSG1' that may be used as a beam refinement signal at the base station.

In this example, MSG1 transmissions may be transmitted in a RO 515 for MSG1 that is in a set of ROs 505 for MSG1 according to a random access configuration provided by a base station. Resources for MSG1' transmissions may be configured in separate RO' 520 resources, which may be in a set of RO's 510. In this example, multiple sets of ROs 505 may be configured in a periodic manner to provide the illustrated first set of ROs 505-*a* through a fourth set of ROs 505-*d*. Likewise, multiple sets of RO's 510 may be configured in a periodic manner to provide the illustrated first set of RO's 510-*a* through a fourth set of RO's 510-*d*. While four sets of RO and RO' resources are illustrated, it is to be understood that more or fewer sets may be configured for either or both of RO and RO'.

In some cases, the resources for the sets of RO's 510 may be configured separate from the random access configuration that provides the RO resources. For example, the sets of RO's 510 may be configured by a base station in RRC signaling, which may provide configuration information that indicates time resources, frequency resources, or combinations thereof, for MSG1' transmissions. Further, in some cases such configuration information may indicate how many repetitions of MSG1' are to be transmitted. In other cases, such configuration may be provided in other signaling, such as RMSI other system information either alone or in combination with RRC signaling of configuration. In some cases, the location of the sets of RO's 510 may be periodic and have a same or different periodicity as the sets of ROs 505. Further, in some cases the sets of RO's 510 may be associated with a SSB, or may be unassociated with a particular SSB, such as illustrated in the examples of FIG. 6.

FIG. 6 illustrates examples of random access occasions 600 that support beam refinement techniques for random access communications in accordance with aspects of the present disclosure. In some examples, random access occasions 600 may be implemented in aspects of wireless communications system 100 or 200. In this example, again, a UE (e.g., a UE 115 of FIG. 1, 2, or 3) may transmit a random access request or a MSG1, and receive a control channel order or a MSG2' in response thereto, that indicates that the UE is to transmit a modified random access request or MSG1' that may be used as a beam refinement signal at the base station.

As discussed with reference to FIG. 5, in some cases MSG1 transmissions may be transmitted in a RO 605 for MSG1 (e.g., that may be in a set of ROs for MSG1) according to a random access configuration provided by a base station. Further, resources for MSG1' transmissions may be configured in separate RO' 610 resources (e.g., that may be in a set of RO's). In some cases, illustrated in first example 615, both the ROs 605 and the RO's for MSG1 and MSG1' transmissions of a UE may be mapped to a same SSB. In other cases, illustrated in second example 620, RO's 610 may be unassociated with a particular SSB.

In first example 615, a first RO 605-*a* and a second RO 605-*b* may both be associated with a first SSB. Thus, a UE that uses first RO 605-*a* or second RO 605-*b* may determine the resources for RO' 610 based on the first SSB as well, to determine that a first RO' 610-*a* and second RO' 610-*b* are available for the MSG1' transmissions.

In the second example 620, a third RO 605-*c* and a fourth RO 605-*d* may both be associated with a first SSB. However, in this example, RO' 610 resources may be unassociated with the first SSB (or any SSB), and may be separately configured such that a third RO' 610-*c*, fourth RO' 610-*d*, fifth RO' 610-*e*, and sixth RO' 610-*f* are available for MSG1' transmissions. Since the RO's 610 of the second example 60 are unassociated with a SSB, a same RO' 610 can be shared by different SSBs. Signaling that configures the RO's 610, as discussed with reference to FIG. 5, may be provided by a base station in RRC signaling, which may provide configuration information that indicates time resources, frequency resources, or combinations thereof, for MSG1' transmissions. Further, in some cases such configuration information may indicate how many repetitions of MSG1' are to be transmitted. In other cases, such configuration may be provided in other signaling, such as RMSI other system information either alone or in combination with RRC signaling of configuration. In some cases, the location of the RO's 610 may be periodic and have a same or different periodicity as the ROs 605. Such techniques may allow for additional resources for transmission of MSG1's, which may allow for lower latency for random access procedures relative to cases where ROs are shared for MSG1 and MSG1' transmissions. In further examples, exact locations of RO resources may not be preconfigured, but may be indicated to a UE based on the control channel order, such as discussed wire reference to FIG. 7.

FIG. 7 illustrates an example of a triggered random access occasion for modified random access requests 700 that supports beam refinement techniques for random access communications in accordance with aspects of the present disclosure. In some examples, triggered random access occasion for modified random access requests 700 may implement aspects of wireless communications system 100 or 200. In this example a UE (e.g., a UE 115 of FIG. 1, 2, or 3) may transmit a random access request or a MSG1 710 using a RO for MSG1 705, and receive a control channel order or a MSG2' 715 in response thereto, that indicates that the UE is to transmit a modified random access request or MSG1' 720 that may be used as a beam refinement signal at the base station. In this example, two repetitions of a same sequence of MSG1' 720 may be transmitted in a first instance of a RO' 725-*a* and a second instance RO' 725-*b* which are illustrated in consecutive resources but in other cases may be in resources that are non-consecutive in time and/or frequency.

In this example, the base station may dynamically trigger the separate RO's 725 for MSG1' 720 transmission by the MSG2' 715, where the RO's 725 are separated from the ROs 705 for MSG1 transmissions 710. In some cases, the base station may configure (e.g., via RRC signaling) time and/or frequency resources, a number of repetitions, etc., for the MSG1' 720 transmissions. Such a configuration may be common for all beams (i.e., there is no beam information for configured RO' 725 resources), and the MSG1' 720 transmission may use the same beam as the MSG1 710 transmission. The configuration information (e.g., RRC configuration) in such cases thus does not provide information on where the RO's 725 are, but defines the structure of the RO's 725, and the exact location of the RO's 725 (i.e., time/frequency resources) is determined based on the MSG2' 715 transmission. Thus, the MSG2' 715 may be considered as an UL grant for MSG1' transmission 720 at preconfigured resources, where the MSG2' 715 provides the exact location of the RO' 725 resources. In some cases, the time domain resources for RO' 725 may be configured relative to the MSG2' 715 transmission, such as at a fixed offset to the MSG2' 715 timing. In some cases, the MSG2' 715 may also include one or more bits that may provide the base station with more flexibility to identify the resources for RO' 725 (e.g., the base station can select a timing offset from two or four available offsets, based on a number of bits).

In some cases, RO and RO' resources, preambles, or any combinations thereof, for the examples of any of FIGS. 4 through 7 may be configured to provide unambiguous identification of resources and parameters for MSG1' communications. In some cases, for a given SSB, a set of corresponding ROs (time and frequency domain) and a set of preamble indices may be configured, and the UE will choose one of them for a MSG1 transmission. Given the MSG1 resource (RO and preamble index), the MSG1' resource (RO' and preamble index) may be mapped in accordance with techniques provided herein. In some cases, a hashing function may be configured from a RO index of a MSG1 transmission, preamble index for MSG1, or combinations thereof, to a RO' index, a preamble index, or combinations thereof, for MSG1'. In some cases, the base station may have flexibility to provide a control value for one or more adjustments to the hashing function to provide RO' resources that may be selected by the base station.

In some cases, the hashing function may be based on the set of MSG1 resources (e.g., ROs and number of preambles for MSG1 in each RO), the set of MSG1' resources (e.g., RO's and a number of preambles for MSG1' in each RO'). In such cases, the inputs to the hashing function may be: the preamble index for MSG1, the RO index for MSG1, and the base station control value which may be a bit value that allows for selection from a set of resources (e.g., similar to the established PUCCH resource indicator (PRI) mechanism in NR). The outputs of the hashing function may be a frequency domain RO' index for MSG1', a preamble index for MSG1', which may be the same for each repetition, or different for each repetition, in cases where repetitions of MSG1' are configured. In some cases, a group hopping algorithm may be used to avoid collision of multiple repetitions of MSG1' from different UEs.

In some cases, the time domain resource for RO' may not be a function of hashing, but determined by a timing of the MSG2' transmission, an available RO' suitable for the MSG1' transmission (e.g., a RO' that corresponds to the same SSB as MSG1), a number of repetitions, and the like. In some cases, a starting RO index for the MSG1' transmission may be associated with the timing of the MSG2' transmission. For example, the starting RO index for the MSG1' transmission may be a first time domain RO opportunity that corresponds to the same SSB index at a certain timeline after reception of MSG2' (e.g., X symbols after the last symbol of a PDCCH that carries MSG2'). In some cases, MSG2' may further include one or more bits or otherwise provide an indication (e.g., based on a shift applied to a bit sequence used in the MSG2' transmission) to indicate a further offset to control the first RO for the MSG1' transmission.

In cases where MSG1 and MSG1' use the same RO resources, such as illustrated in FIG. 4, the hashing function may provide a mapping between the preamble for MSG1' based on the MSG1 preamble, while the set of ROs for MSG1 and MSG1' are the same. In such cases, for MSG1' transmission, the valid RO's are the ROs corresponds to the same SSB as the original RO used for MSG1, after the MSG2' reception. In cases where separate RO's are configured that are associated with a SSB, such as illustrated in the first example of FIG. 6, for each SSB, there is a set of ROs for MSG1 and another set of RO's for MSG1'. In such cases, for MSG1' transmission, the valid RO's may be the RO's that correspond to the same SSB as the original RO used for MSG1, after the MSG2' reception, and preambles may be mapped based on the hashing function, or a same preamble may be used for MSG1' that was used for MSG1. In cases where RO's are unassociated with a particular SSB (e.g., as illustrated in the second example of FIG. 6), for each SSB there is a set of ROs for MSG1, and there is a common set of RO's for MSG1', where a starting RO index and preamble for MSG1' may be selected from the common set of RO's based on the hashing function, and where the RO's may be further selected by MSG2'. In cases where the MSG2' acts as a grant or a trigger to indicate the resources for RO', in additional control may be provided in MSG2' to control the first RO' for the MSG1' transmission (e.g., to add further delay such as if the first RO' is already assigned to a MSG1' of another UE and cannot be shared with MSG1' of a different UE). In some cases, the base station may select the starting index for RO' based on when the MSG2' is transmitted, as well.

Figure 8:
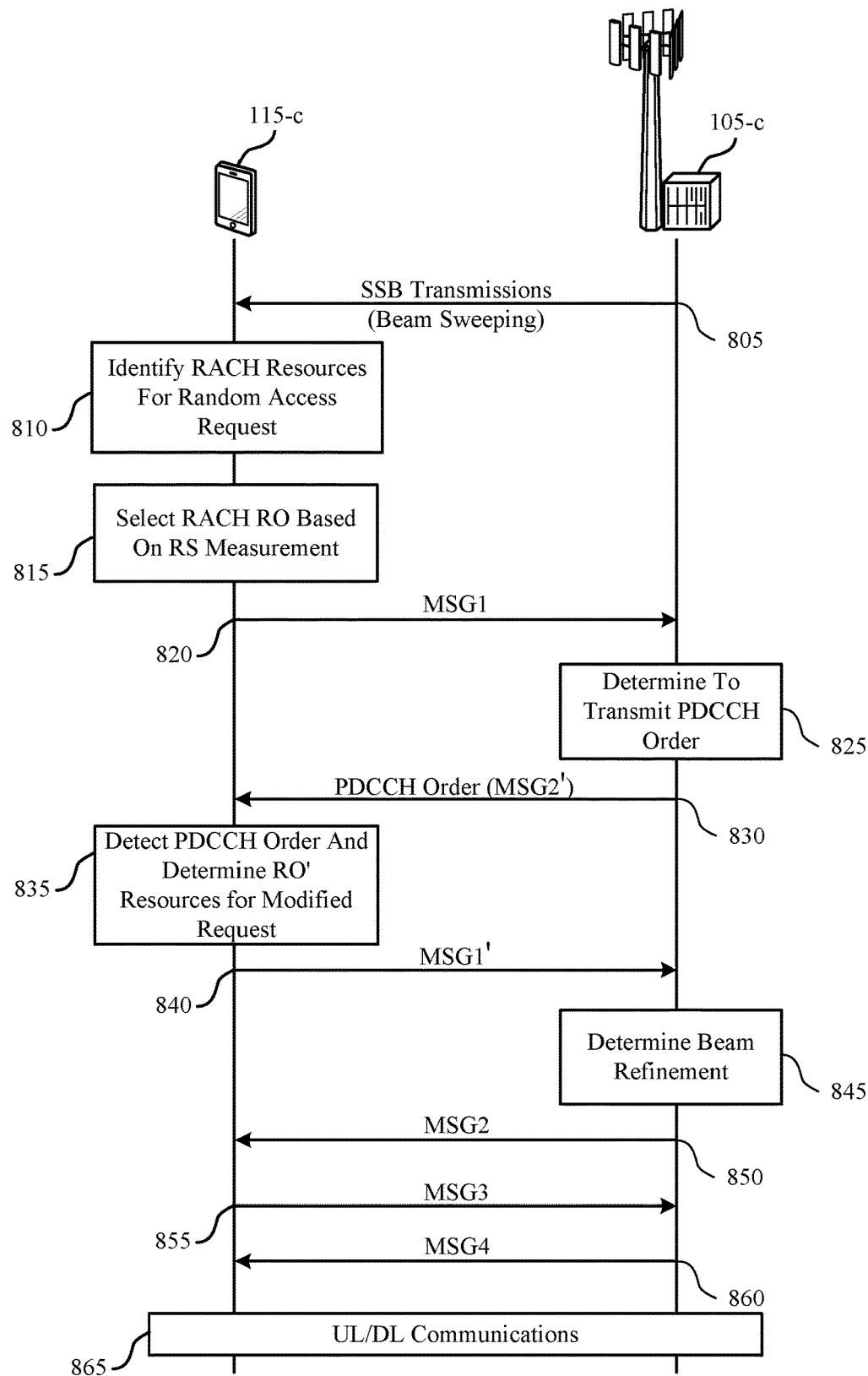
FIG. 8 illustrates an example of a process flow that supports beam refinement techniques for random access communications in accordance with aspects of the present disclosure.

FIG. 8 illustrates an example of a process flow 800 that supports beam refinement techniques for random access communications in accordance with aspects of the present disclosure. In some examples, process flow 800 may implement aspects of wireless communications system 100 or 200. Process flow 800 may be implemented by UE 115-c and base station 105-c, as described herein. Alternative examples of the following may be implemented, where some steps are performed in a different order than described or are not performed at all. In some cases, steps may include additional features not mentioned below, or further steps may be added.

At 805, the base station 105-c may transmit one or more SSB transmissions. In some cases, the SSB transmissions may be beam sweep transmissions of multiple SSBs that include synchronization signals (e.g. a PSS and a SSS) and PBCH transmissions, that are transmitted in a corresponding beam direction. In some cases, the SSBs may indicate an associated uplink transmission resource (e.g., an RO) that UE 115-c may use for a random access transmission.

At 810, the UE 115-b may identify RACH resources for a random access request. As discussed herein, in some cases the RACH resources (e.g., ROs) may be associated with a particular SSB that is selected at the UE 115-b based on a received signal strength.

At 815, the UE 115-b may select a particular RACH resource (e.g., an RO) based on one or more reference signal measurements, a UE capability (e.g., based on a capability of the UE 115-c to receive MSG2' and transmit MSG1' responsive thereto) or any combinations thereof. At 820, based on the selected RACH resources, the UE 115-c may transmit MSG1.

At 825, the base station 105-c may determine to transmit a PDCCH order to the UE 115-c. In some cases, the base station 105-c may make such a determination based on the available random access resources, a signal strength of the MSG1 transmission, and the like. In this example, the base station 105-c determines to transmit PDCCH order, and at 830 transmits the PDCCH order (e.g., MSG2') to the UE 115-c.

At 835, the UE 115-c may detect the PDCCH order and determine to transmit a modified random access request (e.g., a MSG1') to the base station 105-c, which may be used for beam refinement. The UE 115-c may, based on the PDCCH order, determine RO' resources for the MSG1' transmission(s) in accordance with techniques as discussed herein. At 840, the UE 115-c may transmit MSG1' to the base station 105-c.

At 845, the base station 105-c may monitor for the MSG1' transmission using two or more receive beams to determine beam refinement for use in subsequent communications with the UE 115-c. In some cases, the base station 105-c may determine beam refinement based on which of two or more receive beams provide a better signal strength for reception of the MSG1' transmission.

At 850, the base station 105-c may transmit a regular MSG2 to the UE 115-c. The MSG2 transmission may use a refined transmit beam that is determined based on the beam refinement performed at the base station 105-c. At 855, the UE 115-c may transmit MSG3 in accordance with established RACH techniques, followed at 860 by a MSG4 transmission from the base station 105-c and at 865 by uplink/downlink communications between the UE 115-c and the base station 105-c.

Figure 9:
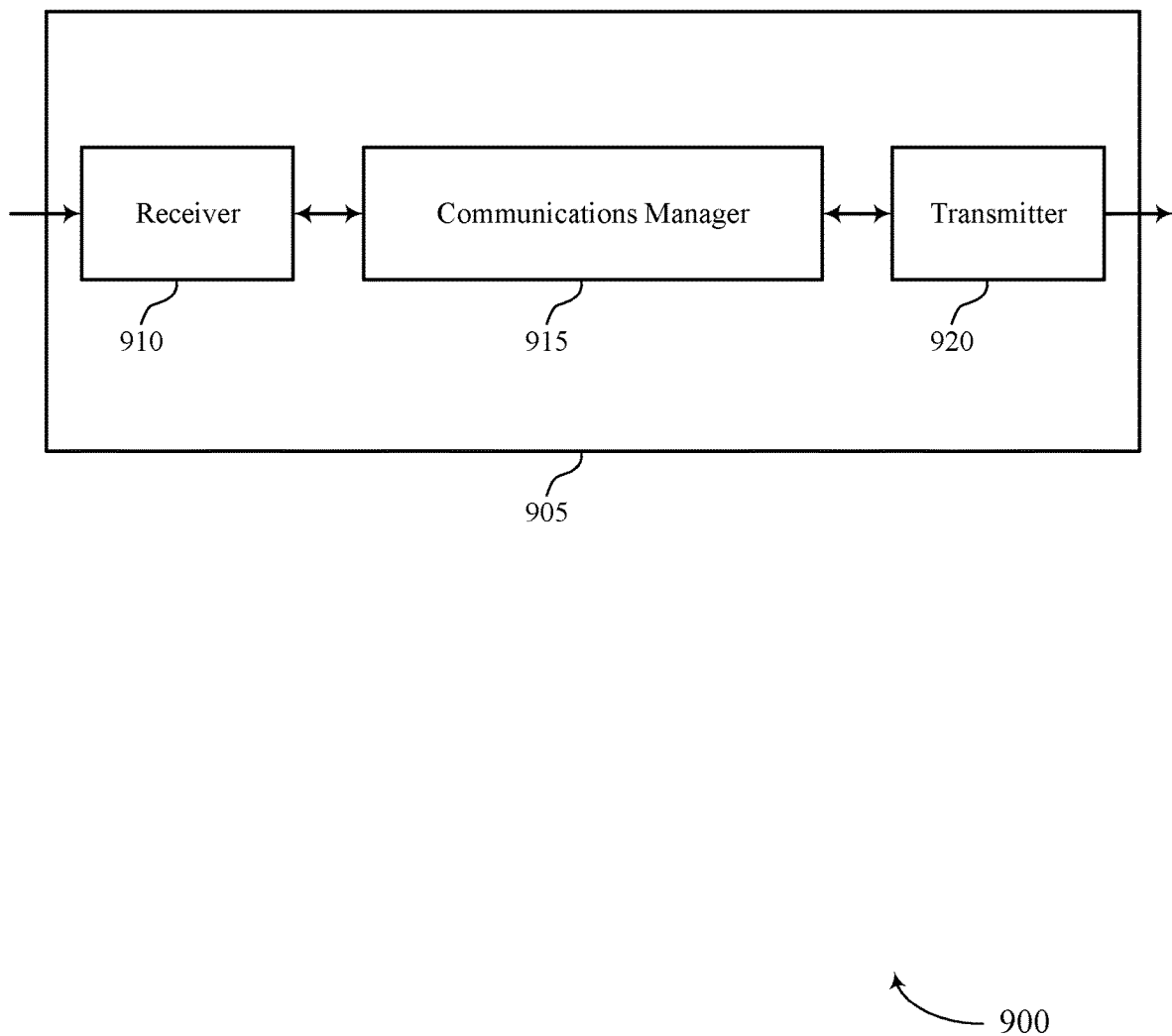
FIGS. 9 and 10 show block diagrams of devices that support beam refinement techniques for random access communications in accordance with aspects of the present disclosure.

FIG. 9 shows a block diagram 900 of a device 905 that supports beam refinement techniques for random access communications in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to beam refinement techniques for random access communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit an initial random access request to a base station to establish a wireless connection with the base station, receive a control channel order from the base station responsive to the initial random access request, determine, based on the control channel order, a set of resources for one or more modified random access requests, transmit the one or more modified random access requests using the determined set of resources, and receive a random access response from the base station responsive to the one or more modified random access requests. The communications manager 915 may be an example of aspects of the communications manager 1210 described herein.

The communications manager 915 may as described herein be implemented to realize one or more potential advantages. One implementation may allow the device 905 to perform random access processes with higher likelihood of success, which may provide enhanced efficiency and reduced access time associated with random access procedures. Further, implementations may allow the device 905 to enhance reliability of communications, increase throughput, and enhance user experience, while reducing power consumption associated with retransmissions or additional random access attempts, among other advantages.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
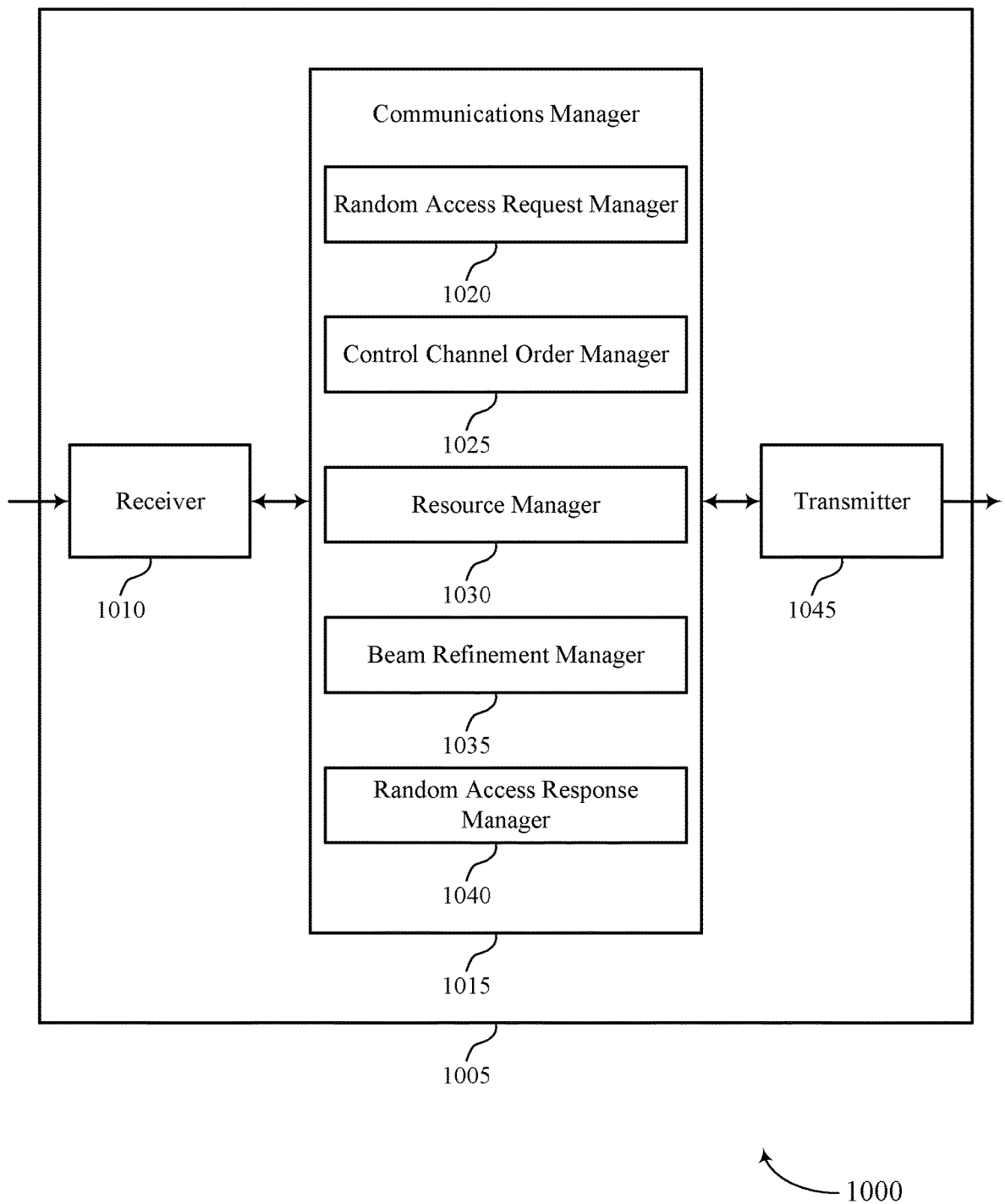

FIG. 10 shows a block diagram 1000 of a device 1005 that supports beam refinement techniques for random access communications in accordance with aspects of the present disclosure. The device 1005 may be an example of aspects of a device 905, or a UE 115 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to beam refinement techniques for random access communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a random access request manager 1020, a control channel order manager 1025, a resource manager 1030, a beam refinement manager 1035, and a random access response manager 1040. The communications manager 1015 may be an example of aspects of the communications manager 1210 described herein.

The random access request manager 1020 may transmit an initial random access request to a base station to establish a wireless connection with the base station.

The control channel order manager 1025 may receive a control channel order from the base station responsive to the initial random access request.

The resource manager 1030 may determine, based on the control channel order, a set of resources for one or more modified random access requests.

The beam refinement manager 1035 may transmit the one or more modified random access requests using the determined set of resources.

The random access response manager 1040 may receive a random access response from the base station responsive to the one or more modified random access requests.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
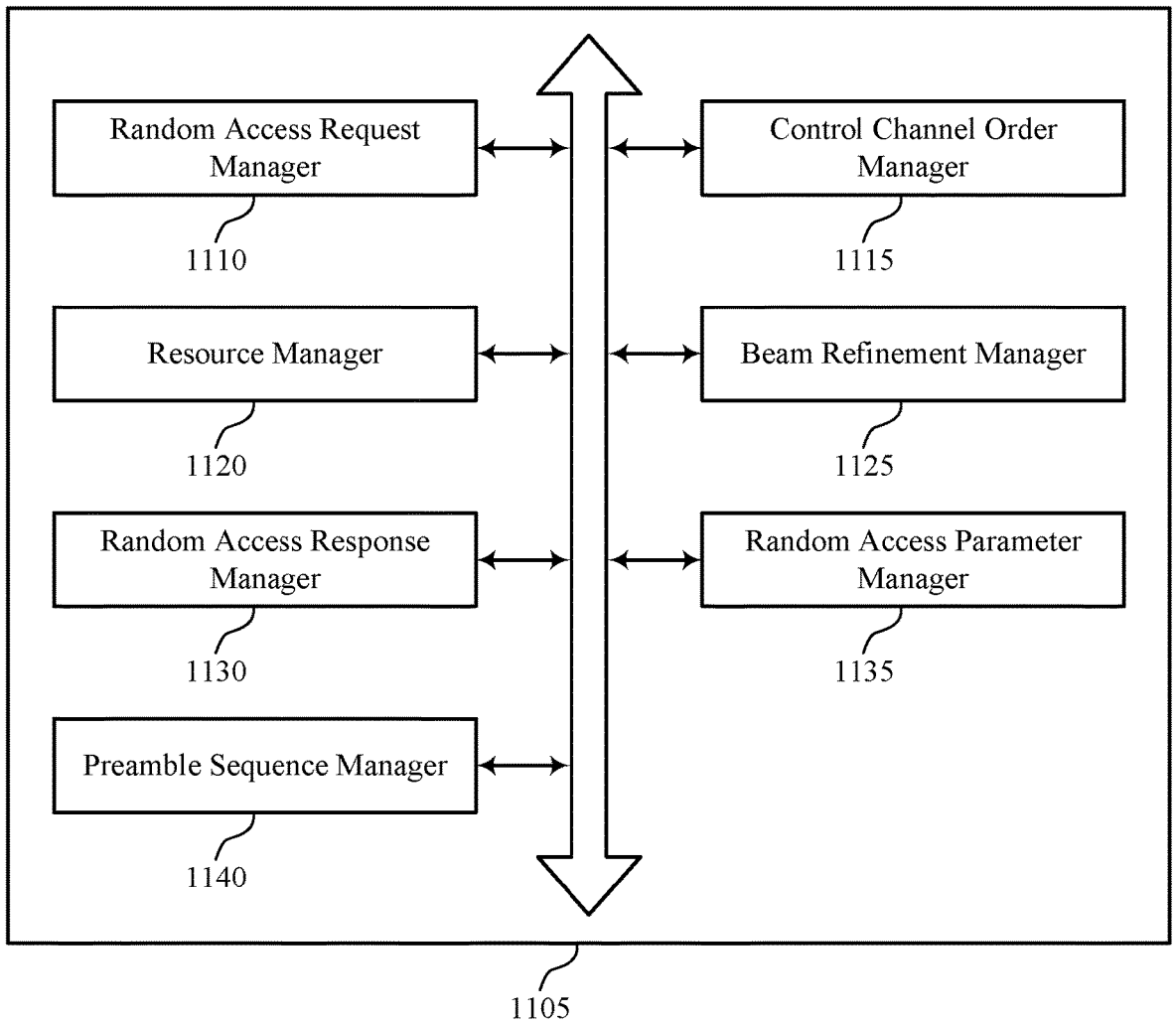
FIG. 11 shows a block diagram of a communications manager that supports beam refinement techniques for random access communications in accordance with aspects of the present disclosure.

FIG. 11 shows a block diagram 1100 of a communications manager 1105 that supports beam refinement techniques for random access communications in accordance with aspects of the present disclosure. The communications manager 1105 may be an example of aspects of a communications manager 915, a communications manager 1015, or a communications manager 1210 described herein. The communications manager 1105 may include a random access request manager 1110, a control channel order manager 1115, a resource manager 1120, a beam refinement manager 1125, a random access response manager 1130, a random access parameter manager 1135, and a preamble sequence manager 1140. Each of these modules may communicate, directly or indirectly, with one another (e.g., via one or more buses).

The random access request manager 1110 may transmit an initial random access request to a base station to establish a wireless connection with the base station.

The control channel order manager 1115 may receive a control channel order from the base station responsive to the initial random access request. In some cases, the control channel order acts as an uplink grant for the one or more modified random access requests using the set of resources. In some cases, the set of resources are determined based on a location of the control channel order. In some cases, a time domain location of the set of resources is based on a time offset from the control channel order. In some cases, a time domain location of the set of resources is based on a fixed time offset from the control channel order or a time offset indicated by one or more bits in the control channel order.

The resource manager 1120 may determine, based on the control channel order, a set of resources for one or more modified random access requests. In some examples, the resource manager 1120 may identify the set of resources in a subsequent random access occasion to the first random access occasion based on the control channel order, where the subsequent random access occasion is associated with a same synchronization signal block (SSB) as the first random access occasion.

In some examples, the resource manager 1120 may identify the set of resources for the one or more modified random access requests based on a second random access occasion configuration that is different than a first random access occasion configuration of the initial random access request. In some examples, the resource manager 1120 may identify the set of resources based on an indication provided by the control channel order.

In some examples, the resource manager 1120 may receive, in RRC signaling, a set of parameters associated with a random access occasion for transmission of the one or more modified random access requests, and where the control channel order triggers transmission of the one or more modified random access requests in the random access occasion. In some examples, the resource manager 1120 may select the set of resources from a configured number of available resources for transmission of the one or more modified random access requests, and where the selecting is based on one or more of a timing of the control channel order or an offset that is indicated by the control channel order.

In some examples, the resource manager 1120 may identify a configured set of parameters for a random access occasion associated with the one or more modified random access requests. In some examples, the resource manager 1120 may determine a location of the set of resources based on the configured set of parameters and one or more of a timing of the control channel order or an offset that is indicated by the control channel order.

In some cases, the second random access occasion configuration is received in RRC signaling from the base station. In some cases, the second random access occasion configuration includes configuration parameters for one or more of time resources of a second random access occasion, frequency resources of the second random access occasion, a number of repetitions of the modified random access request that are to be transmitted, or any combinations thereof.

In some cases, a set of periodic resources are provided for the one or more modified random access requests. In some cases, the second random access occasion configuration is associated with a synchronization signal block (SSB) that was used to identify uplink resources for the initial random access request. In some cases, a set of different random access occasions for transmission of modified random access requests are configured for each of a set of different SSBs.

In some cases, the second random access occasion configuration is unassociated with any synchronization signal block (SSB). In some cases, a set of different random access occasions for transmission of modified random access requests are shared by two or more different SSBs. In some cases, the RRC signaling provides one or more of time resources or frequency resources for the random access occasion, a number of repetitions for the one or more modified random access requests, or any combinations thereof.

In some cases, a function to determine a random access occasion is based on a control value provided in the control channel order. In some cases, the function outputs one or more of a frequency domain index for the one or more modified random access requests, a preamble index for the one or more modified random access requests, or any combinations thereof.

In some cases, a starting random access occasion index associated with the set of resources is determined based on a time domain location of the control channel order. In some cases, a starting time domain resource of the set of resources is based on an initial time domain resource that corresponds to a synchronization signal block (SSB) index associated with the initial random access request and a fixed or signaled time domain offset from a second time domain resource of the control channel order. In some cases, the set of resources includes resources in a second random access occasion that is determined as a function of a first random access occasion associated with the initial random access request.

The beam refinement manager 1125 may transmit the one or more modified random access requests using the determined set of resources. The random access response manager 1130 may receive a random access response from the base station responsive to the one or more modified random access requests. The random access parameter manager 1135 may identify one or more parameters for the one or more modified random access requests based on a first random access occasion that has a same random access occasion configuration as the initial random access request.

The preamble sequence manager 1140 may select, from a first subset of preamble sequences associated with the first random access occasion, a first preamble sequence for the one or more modified random access requests, where the first subset of preamble sequences is non-overlapping with a second subset preamble sequences that are available for initial random access requests associated with the first random access occasion. In some examples, the preamble sequence manager 1140 may determine a second preamble for the one or more modified random access requests as a function of a first random access occasion associated with the initial random access request, a first preamble of the initial random access request, or any combinations thereof. In some examples, the preamble sequence manager 1140 may determine a second random access preamble for the one or more modified random access requests as a function of a first random access preamble used for the initial random access request. In some cases, a same preamble is used for each of two or more repetitions of the modified random access request, or a different preamble is used for each of two or more repetitions of the modified random access request based on a hopping algorithm.

Figure 12:
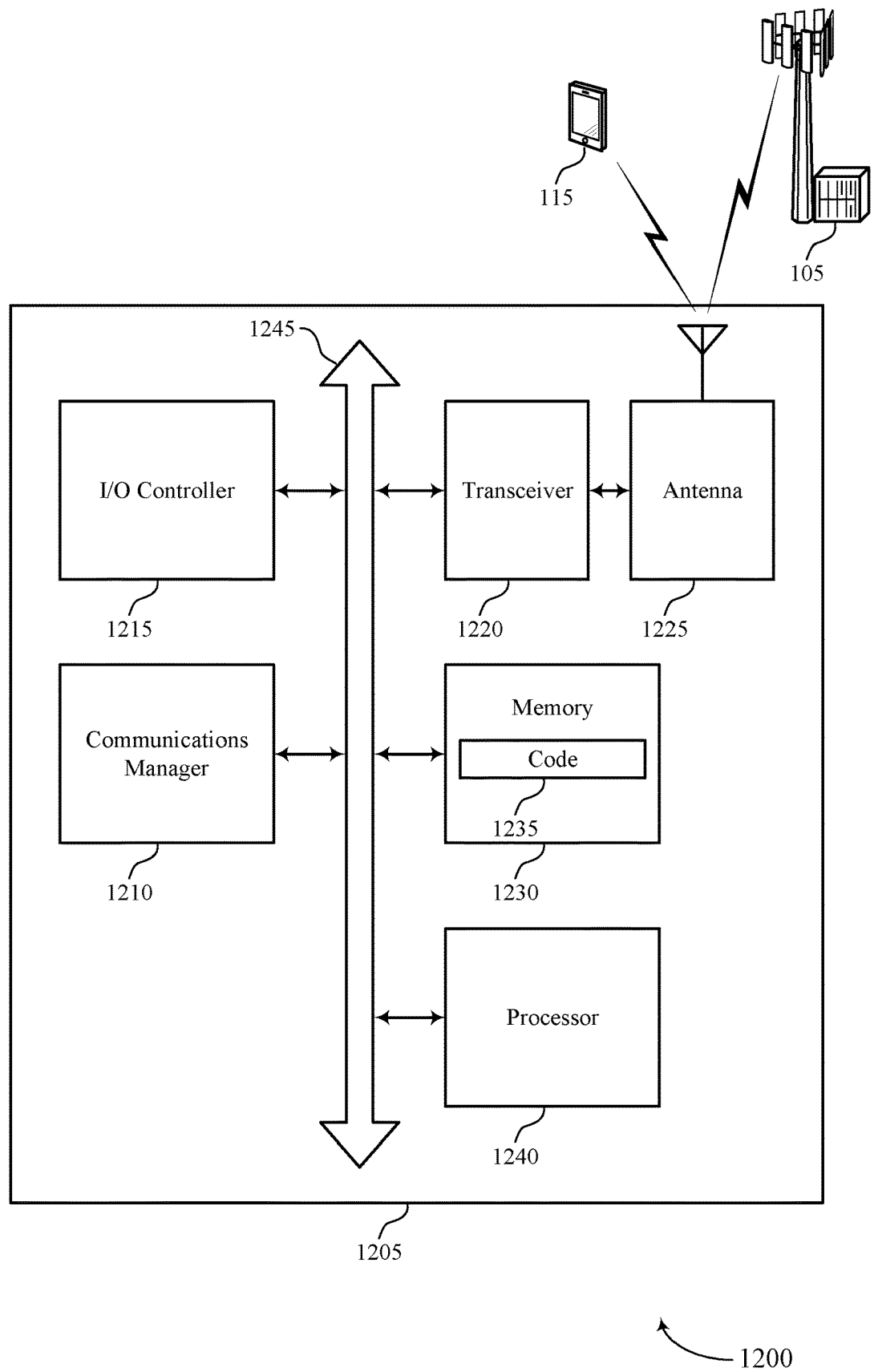
FIG. 12 shows a diagram of a system including a device that supports beam refinement techniques for random access communications in accordance with aspects of the present disclosure.

FIG. 12 shows a diagram of a system 1200 including a device 1205 that supports beam refinement techniques for random access communications in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may transmit an initial random access request to a base station to establish a wireless connection with the base station, receive a control channel order from the base station responsive to the initial random access request, determine, based on the control channel order, a set of resources for one or more modified random access requests, transmit the one or more modified random access requests using the determined set of resources, and receive a random access response from the base station responsive to the one or more modified random access requests.

The communications manager 1210 may as described herein be implemented to realize one or more potential advantages. One implementation may allow the device 1205 to perform random access processes with higher likelihood of success, which may provide enhanced efficiency and reduced access time associated with random access procedures. Further, implementations may allow the device 1205 to enhance reliability of communications, increase throughput, and enhance user experience, while reducing power consumption associated with retransmissions or additional random access attempts, among other advantages.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting beam refinement techniques for random access communications).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
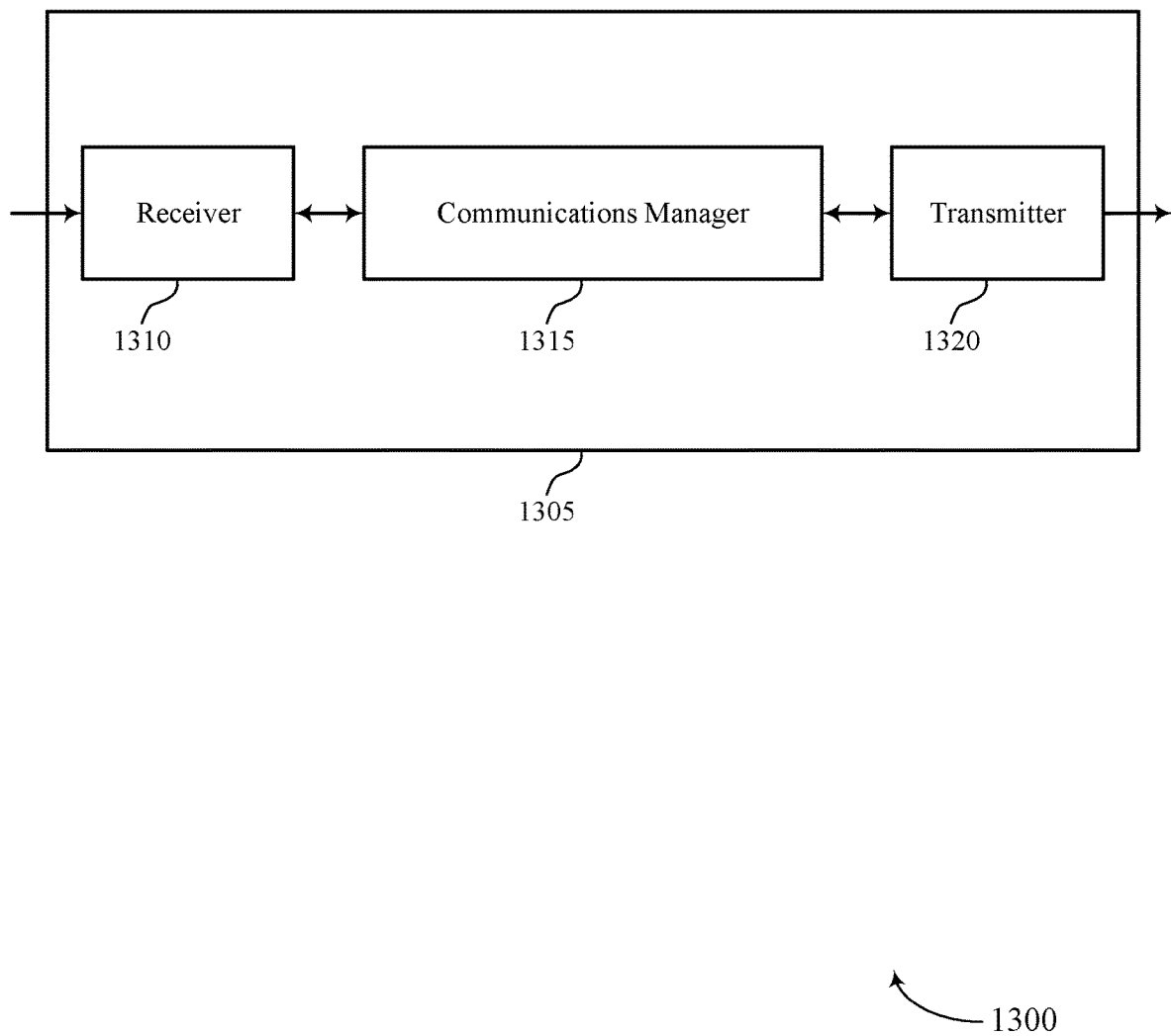
FIGS. 13 and 14 show block diagrams of devices that support beam refinement techniques for random access communications in accordance with aspects of the present disclosure.

FIG. 13 shows a block diagram 1300 of a device 1305 that supports beam refinement techniques for random access communications in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to beam refinement techniques for random access communications, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may receive, from a UE, an initial random access request to establish a wireless connection with the base station, transmit a control channel order to the UE responsive to the initial random access request, determine, based on the control channel order, a set of resources for one or more modified random access requests, monitor for the one or more modified random access requests using the determined set of resources, and transmit a random access response to the UE using one or more beamforming parameters that are based on measurements associated with the one or more modified random access requests. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
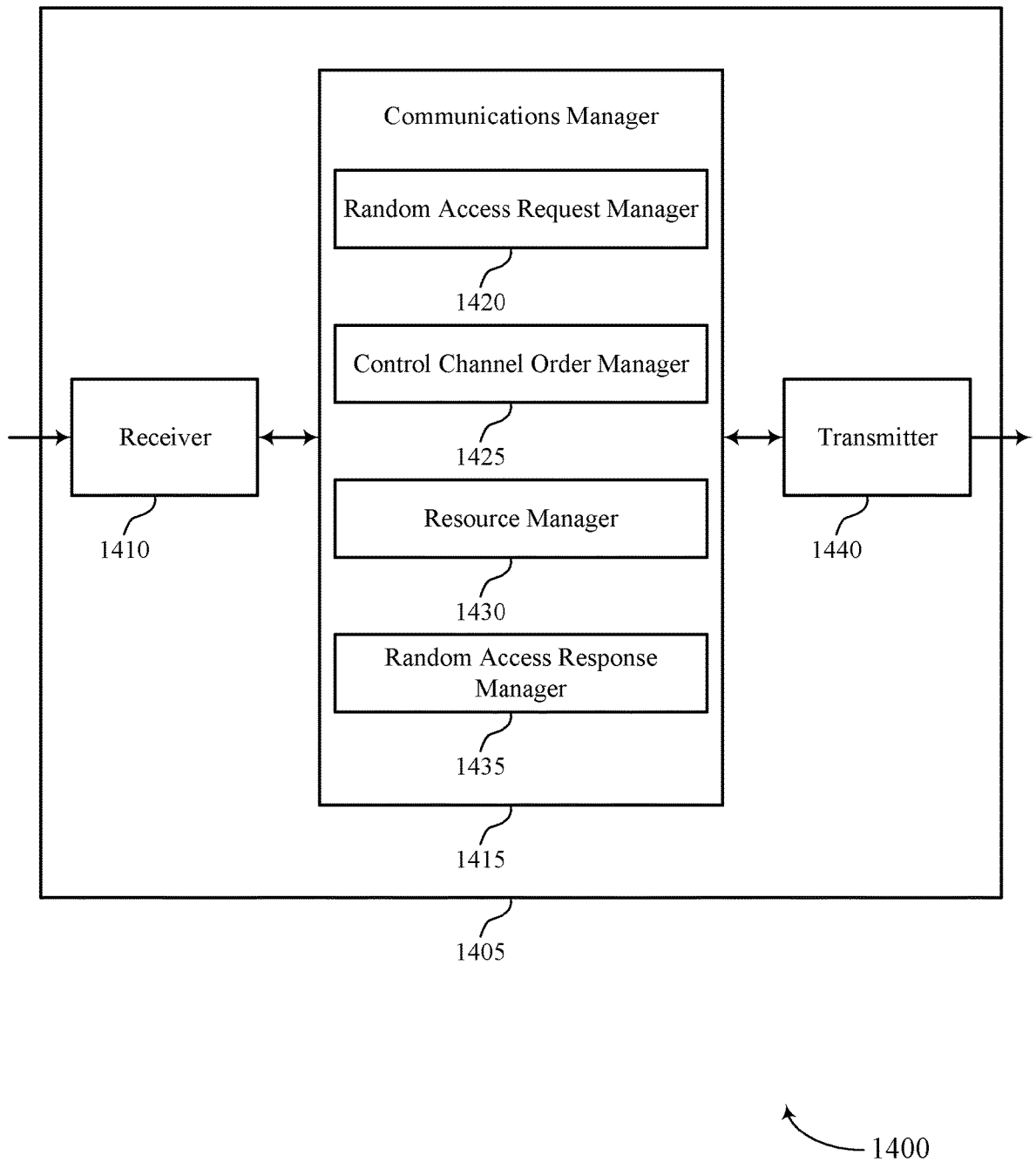

FIG. 14 shows a block diagram 1400 of a device 1405 that supports beam refinement techniques for random access communications in accordance with aspects of the present disclosure. The device 1405 may be an example of aspects of a device 1305, or a base station 105 as described herein. The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to beam refinement techniques for random access communications, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a random access request manager 1420, a control channel order manager 1425, a resource manager 1430, and a random access response manager 1435. The communications manager 1415 may be an example of aspects of the communications manager 1610 described herein.

The random access request manager 1420 may receive, from a UE, an initial random access request to establish a wireless connection with the base station.

The control channel order manager 1425 may transmit a control channel order to the UE responsive to the initial random access request.

The resource manager 1430 may determine, based on the control channel order, a set of resources for one or more modified random access requests and monitor for the one or more modified random access requests using the determined set of resources.

The random access response manager 1435 may transmit a random access response to the UE using one or more beamforming parameters that are based on measurements associated with the one or more modified random access requests.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
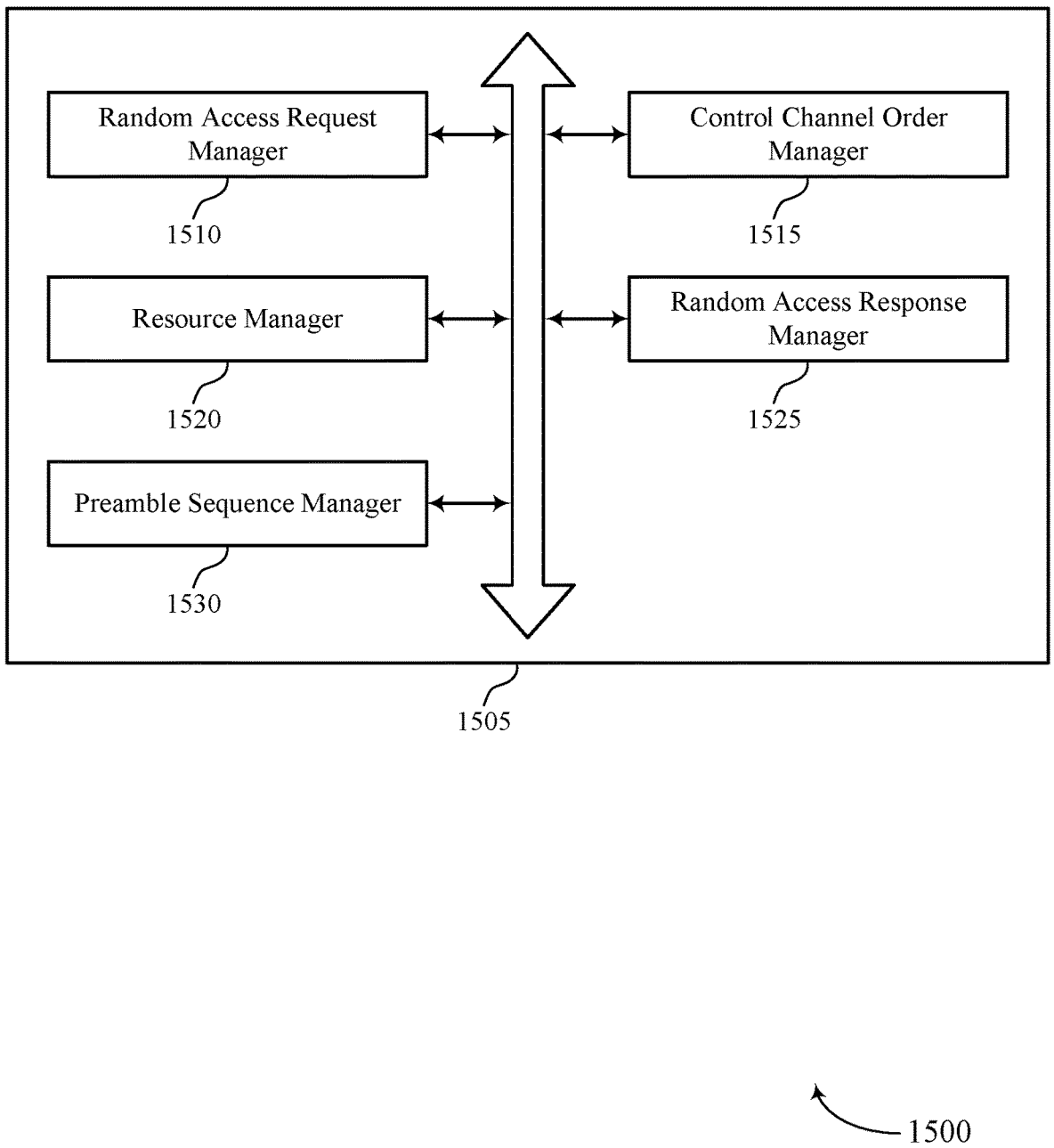
FIG. 15 shows a block diagram of a communications manager that supports beam refinement techniques for random access communications in accordance with aspects of the present disclosure.

FIG. 15 shows a block diagram 1500 of a communications manager 1505 that supports beam refinement techniques for random access communications in accordance with aspects of the present disclosure. The communications manager 1505 may be an example of aspects of a communications manager 1315, a communications manager 1415, or a communications manager 1610 described herein. The communications manager 1505 may include a random access request manager 1510, a control channel order manager 1515, a resource manager 1520, a random access response manager 1525, and a preamble sequence manager 1530. Each of these modules may communicate, directly or indirectly, with one another (e.g., via one or more buses).

The random access request manager 1510 may receive, from a UE, an initial random access request to establish a wireless connection with the base station.

The control channel order manager 1515 may transmit a control channel order to the UE responsive to the initial random access request. In some examples, the control channel order manager 1515 may provide an indication to the UE in the control channel order that identifies the set of resources. In some cases, the control channel order acts as an uplink grant for the one or more modified random access requests using the set of resources. In some cases, the set of resources are determined based on a location of the control channel order. In some cases, a time domain location of the set of resources is based on a time offset from the control channel order. In some cases, a time domain location of the set of resources is based on a fixed time offset from the control channel order or a time offset indicated by one or more bits in the control channel order.

The resource manager 1520 may determine, based on the control channel order, a set of resources for one or more modified random access requests. In some examples, the resource manager 1520 may monitor for the one or more modified random access requests using the determined set of resources. In some examples, the resource manager 1520 may identify one or more parameters for the one or more modified random access requests based on a first random access occasion that has a same random access occasion configuration as the initial random access request.

In some examples, the resource manager 1520 may identify the set of resources in a subsequent random access occasion to the first random access occasion based on the control channel order, where the subsequent random access occasion is associated with a same synchronization signal block (SSB) as the first random access occasion. In some examples, the resource manager 1520 may identify the set of resources for the one or more modified random access requests based on a second random access occasion configuration that is different than a first random access occasion configuration of the initial random access request.

In some examples, the resource manager 1520 may transmit the second random access occasion configuration to the UE in RRC signaling. In some examples, the resource manager 1520 may transmit, in RRC signaling, a set of parameters associated with a random access occasion for transmission of the one or more modified random access requests, and where the control channel order triggers transmission of the one or more modified random access requests in the random access occasion.

In some examples, the resource manager 1520 may configure the UE with a number of available resources for transmission of the one or more modified random access requests, and where the set of resources is selected from the number of available resources based on one or more of a timing of the control channel order or an offset that is indicated by the control channel order.

In some examples, the resource manager 1520 may configure a set of parameters for a random access occasion associated with the one or more modified random access requests. In some examples, the resource manager 1520 may where a location of the set of resources is based on the configured set of parameters and one or more of a timing of the control channel order or an offset that is indicated by the control channel order. In some cases, the second random access occasion configuration includes parameters for one or more of time resources of a second random access occasion, frequency resources of the second random access occasion, a number of repetitions of the modified random access request that are to be transmitted, or any combinations thereof. In some cases, a set of periodic resources are provided for the one or more modified random access requests.

In some cases, the second random access occasion configuration is associated with a synchronization signal block (SSB) used to identify uplink resources for the initial random access request. In some cases, a set of different random access occasions for transmission of modified random access requests are configured for each of a set of different SSBs. In some cases, the second random access occasion configuration is unassociated with any synchronization signal block (SSB). In some cases, a set of different random access occasions for transmission of modified random access requests are shared by two or more different SSBs.

In some cases, the RRC signaling provides one or more of time resources or frequency resources for the random access occasion, a number of repetitions for the one or more modified random access requests, or any combinations thereof. In some cases, a starting random access occasion index associated with the set of resources is determined based on a time domain location of the control channel order. In some cases, a starting time domain resource of the set of resources is based on an initial time domain resource that corresponds to a synchronization signal block (SSB) index associated with the initial random access request and a fixed or signaled time domain offset from a second time domain resource of the control channel order. In some cases, the set of resources includes resources in a second random access occasion that is determined as a function of a first random access occasion associated with the initial random access request.

The random access response manager 1525 may transmit a random access response to the UE using one or more beamforming parameters that are based on measurements associated with the one or more modified random access requests.

The preamble sequence manager 1530 may determine that the one or more modified random access requests are associated with the UE based on the one or more modified random access requests having a preamble that is a function of a first random access occasion associated with the initial random access request, a first preamble of the initial random access request, or any combinations thereof. In some cases, a first subset of preamble sequences of the first random access occasion are associated with initial random access request messages, and a second subset of preamble sequences of the first random access occasion are associated with modified random access messages, where the first subset of preamble sequences is non-overlapping with the second subset preamble sequences. In some cases, the function is further based on a control value provided in the control channel order.

In some cases, a second random access preamble for the one or more modified random access requests is a function of a first random access preamble used for the initial random access request. In some cases, the function outputs one or more of a frequency domain index for the one or more modified random access requests, a preamble index for the one or more modified random access requests, or any combinations thereof. In some cases, a same preamble is used for each of two or more repetitions of the modified random access request, or a different preamble is used for each of two or more repetitions of the modified random access request based on a hopping algorithm.

Figure 16:
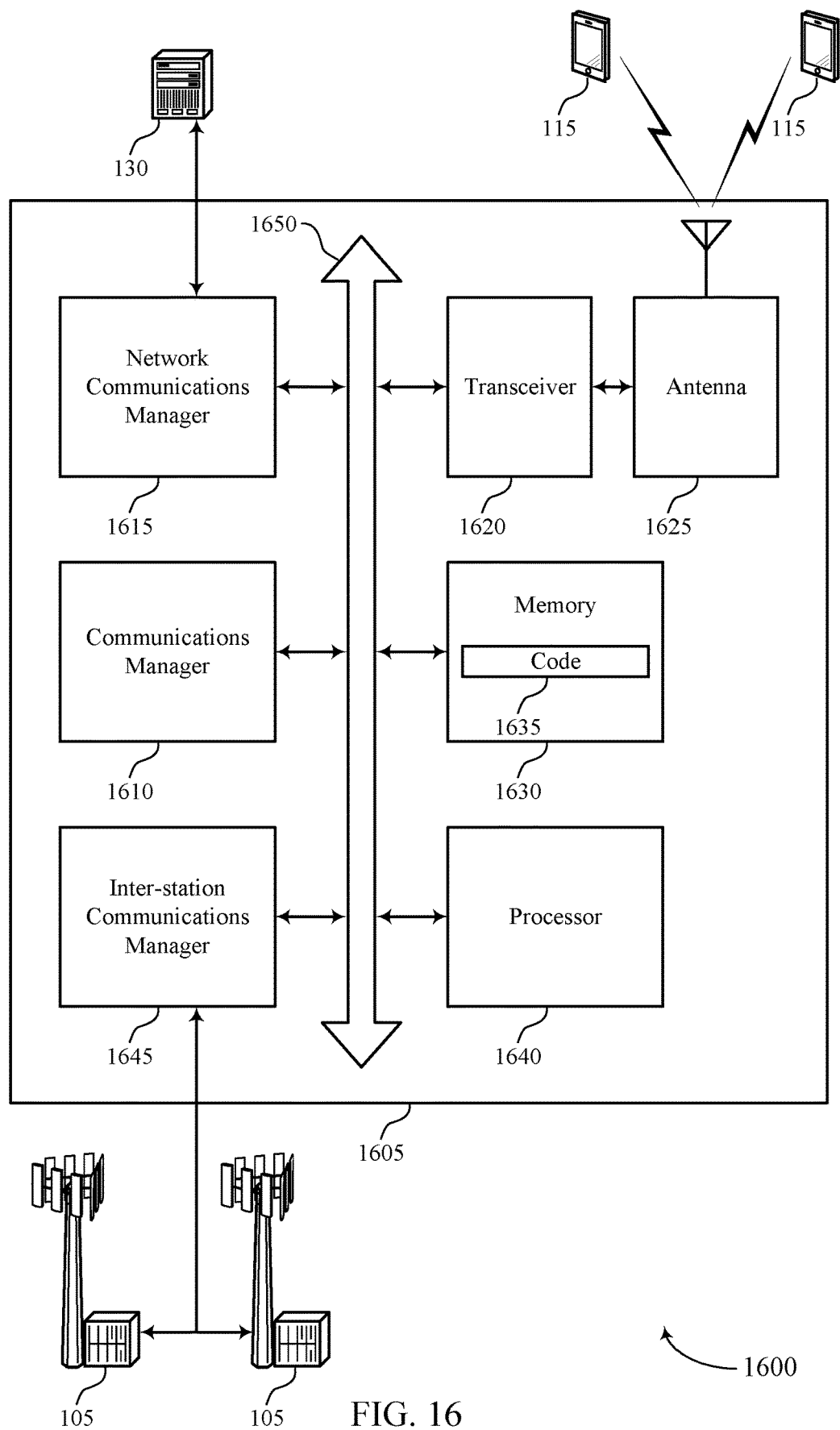
FIG. 16 shows a diagram of a system including a device that supports beam refinement techniques for random access communications in accordance with aspects of the present disclosure.

FIG. 16 shows a diagram of a system 1600 including a device 1605 that supports beam refinement techniques for random access communications in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may receive, from a UE, an initial random access request to establish a wireless connection with the base station, transmit a control channel order to the UE responsive to the initial random access request, determine, based on the control channel order, a set of resources for one or more modified random access requests, monitor for the one or more modified random access requests using the determined set of resources, and transmit a random access response to the UE using one or more beamforming parameters that are based on measurements associated with the one or more modified random access requests.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting beam refinement techniques for random access communications).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
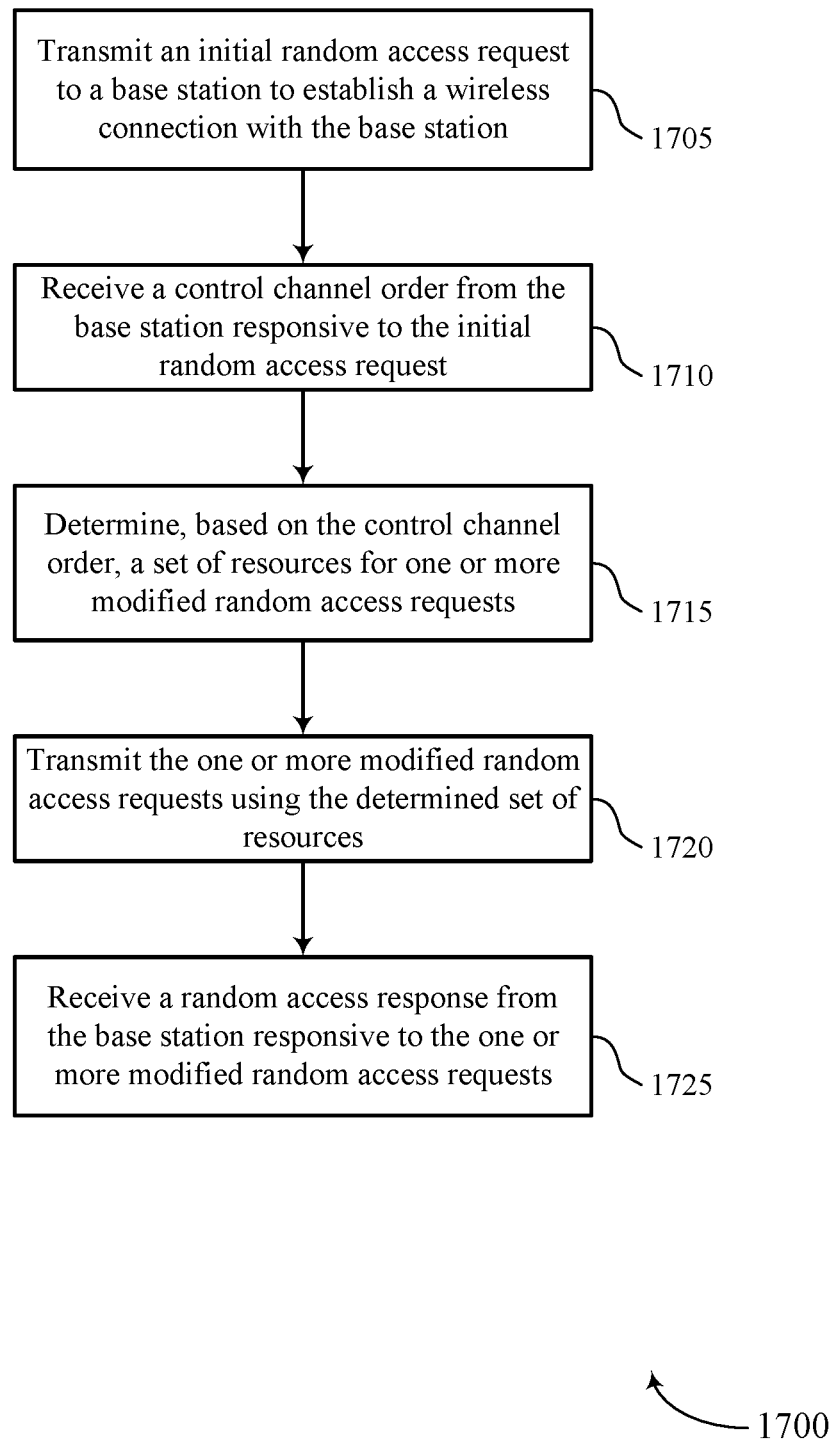
FIGS. 17 through 24 show flowcharts illustrating methods that support beam refinement techniques for random access communications in accordance with aspects of the present disclosure.

FIG. 17 shows a flowchart illustrating a method 1700 that supports beam refinement techniques for random access communications in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may transmit an initial random access request to a base station to establish a wireless connection with the base station. The operations of 1705 may be performed according to the methods described herein. In some examples, aspects of the operations of 1705 may be performed by a random access request manager as described with reference to FIGS. 9 through 12.

At 1710, the UE may receive a control channel order from the base station responsive to the initial random access request. The operations of 1710 may be performed according to the methods described herein. In some examples, aspects of the operations of 1710 may be performed by a control channel order manager as described with reference to FIGS. 9 through 12.

At 1715, the UE may determine, based on the control channel order, a set of resources for one or more modified random access requests. The operations of 1715 may be performed according to the methods described herein. In some examples, aspects of the operations of 1715 may be performed by a resource manager as described with reference to FIGS. 9 through 12.

At 1720, the UE may transmit the one or more modified random access requests using the determined set of resources. The operations of 1720 may be performed according to the methods described herein. In some examples, aspects of the operations of 1720 may be performed by a beam refinement manager as described with reference to FIGS. 9 through 12.

At 1725, the UE may receive a random access response from the base station responsive to the one or more modified random access requests. The operations of 1725 may be performed according to the methods described herein. In some examples, aspects of the operations of 1725 may be performed by a random access response manager as described with reference to FIGS. 9 through 12.

Figure 18:
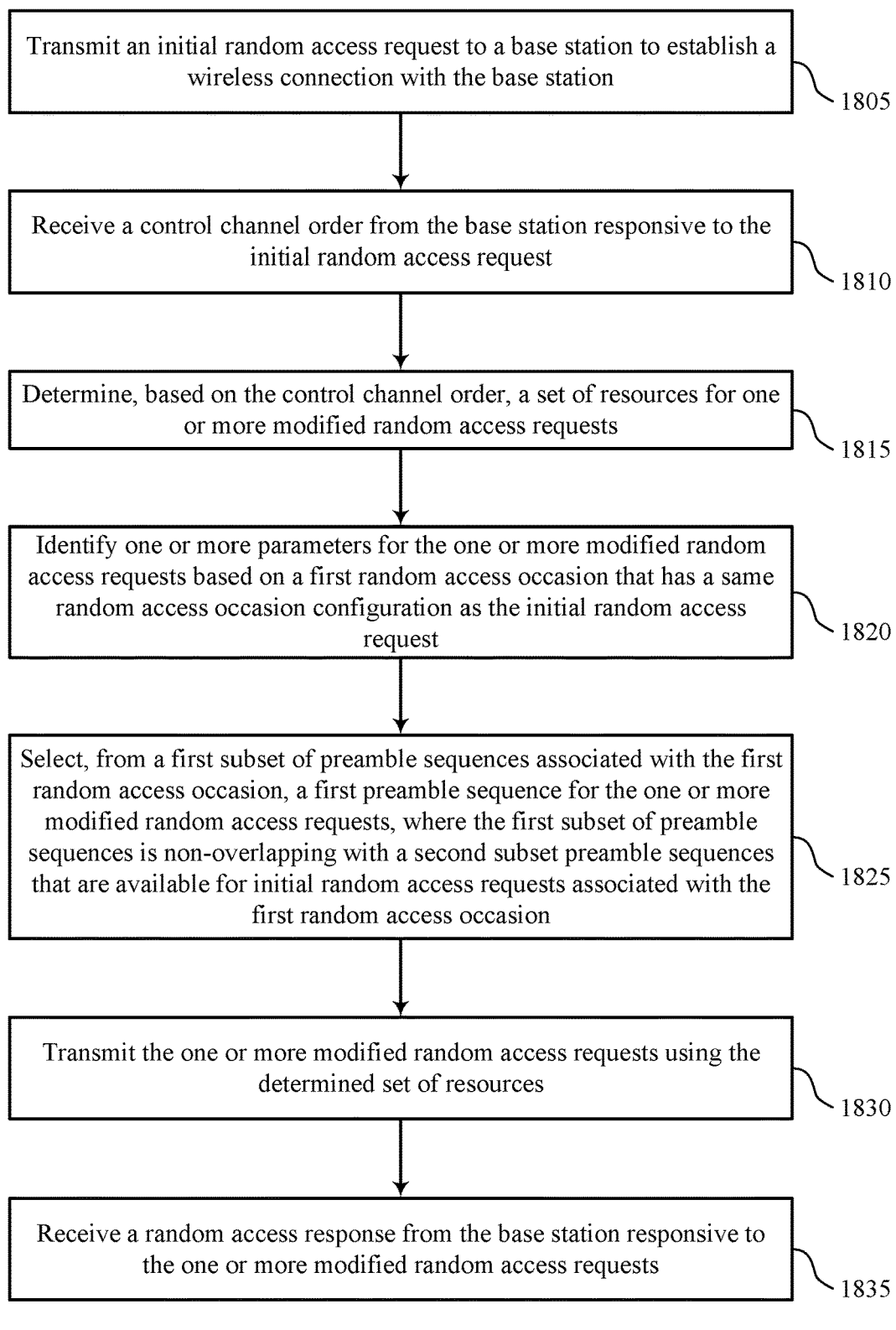

FIG. 18 shows a flowchart illustrating a method 1800 that supports beam refinement techniques for random access communications in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may transmit an initial random access request to a base station to establish a wireless connection with the base station. The operations of 1805 may be performed according to the methods described herein. In some examples, aspects of the operations of 1805 may be performed by a random access request manager as described with reference to FIGS. 9 through 12.

At 1810, the UE may receive a control channel order from the base station responsive to the initial random access request. The operations of 1810 may be performed according to the methods described herein. In some examples, aspects of the operations of 1810 may be performed by a control channel order manager as described with reference to FIGS. 9 through 12.

At 1815, the UE may determine, based on the control channel order, a set of resources for one or more modified random access requests. The operations of 1815 may be performed according to the methods described herein. In some examples, aspects of the operations of 1815 may be performed by a resource manager as described with reference to FIGS. 9 through 12.

At 1820, the UE may identify one or more parameters for the one or more modified random access requests based on a first random access occasion that has a same random access occasion configuration as the initial random access request. The operations of 1820 may be performed according to the methods described herein. In some examples, aspects of the operations of 1820 may be performed by a random access parameter manager as described with reference to FIGS. 9 through 12.

At 1825, the UE may select, from a first subset of preamble sequences associated with the first random access occasion, a first preamble sequence for the one or more modified random access requests, where the first subset of preamble sequences is non-overlapping with a second subset preamble sequences that are available for initial random access requests associated with the first random access occasion. The operations of 1825 may be performed according to the methods described herein. In some examples, aspects of the operations of 1825 may be performed by a preamble sequence manager as described with reference to FIGS. 9 through 12.

At 1830, the UE may transmit the one or more modified random access requests using the determined set of resources. The operations of 1830 may be performed according to the methods described herein. In some examples, aspects of the operations of 1830 may be performed by a beam refinement manager as described with reference to FIGS. 9 through 12.

At 1835, the UE may receive a random access response from the base station responsive to the one or more modified random access requests. The operations of 1835 may be performed according to the methods described herein. In some examples, aspects of the operations of 1835 may be performed by a random access response manager as described with reference to FIGS. 9 through 12.

Figure 19:
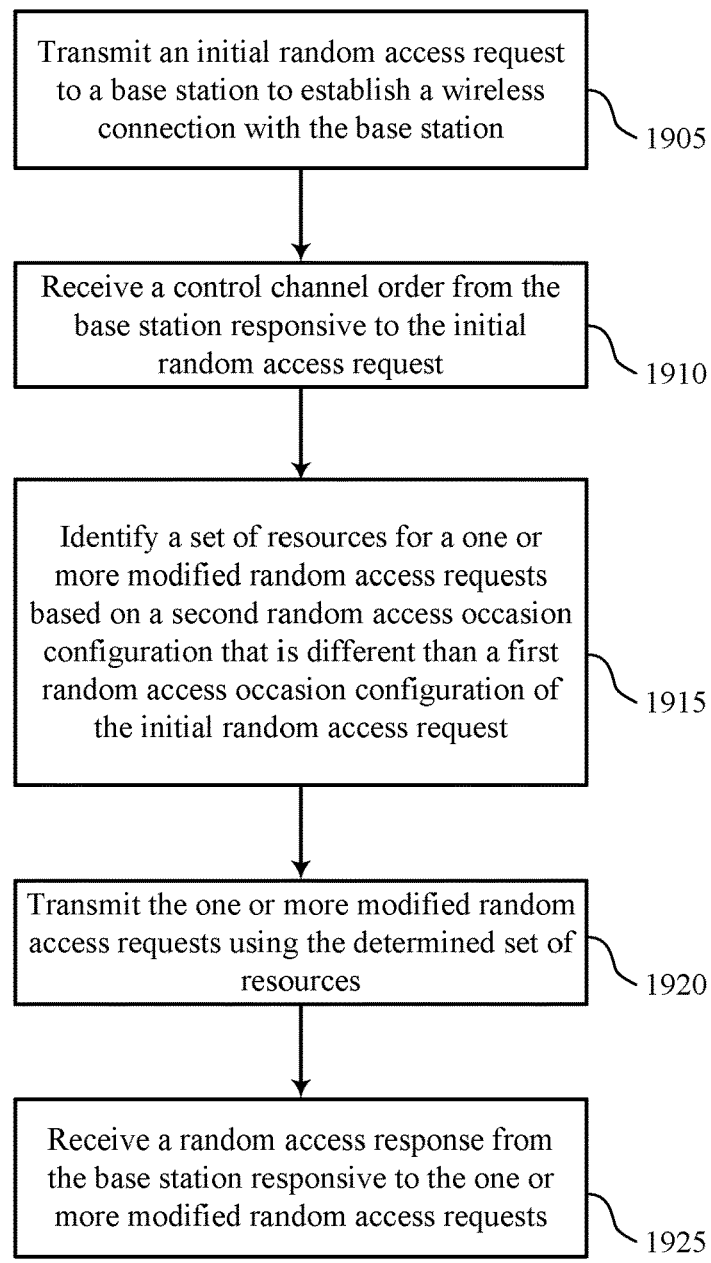

FIG. 19 shows a flowchart illustrating a method 1900 that supports beam refinement techniques for random access communications in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may transmit an initial random access request to a base station to establish a wireless connection with the base station. The operations of 1905 may be performed according to the methods described herein. In some examples, aspects of the operations of 1905 may be performed by a random access request manager as described with reference to FIGS. 9 through 12.

At 1910, the UE may receive a control channel order from the base station responsive to the initial random access request. The operations of 1910 may be performed according to the methods described herein. In some examples, aspects of the operations of 1910 may be performed by a control channel order manager as described with reference to FIGS. 9 through 12.

At 1915, the UE may identify a set of resources for one or more modified random access requests based on a second random access occasion configuration that is different than a first random access occasion configuration of the initial random access request. The operations of 1915 may be performed according to the methods described herein. In some examples, aspects of the operations of 1915 may be performed by a resource manager as described with reference to FIGS. 9 through 12.

At 1920, the UE may transmit the one or more modified random access requests using the determined set of resources. The operations of 1920 may be performed according to the methods described herein. In some examples, aspects of the operations of 1920 may be performed by a beam refinement manager as described with reference to FIGS. 9 through 12.

At 1925, the UE may receive a random access response from the base station responsive to the one or more modified random access requests. The operations of 1925 may be performed according to the methods described herein. In some examples, aspects of the operations of 1925 may be performed by a random access response manager as described with reference to FIGS. 9 through 12.

Figure 20:
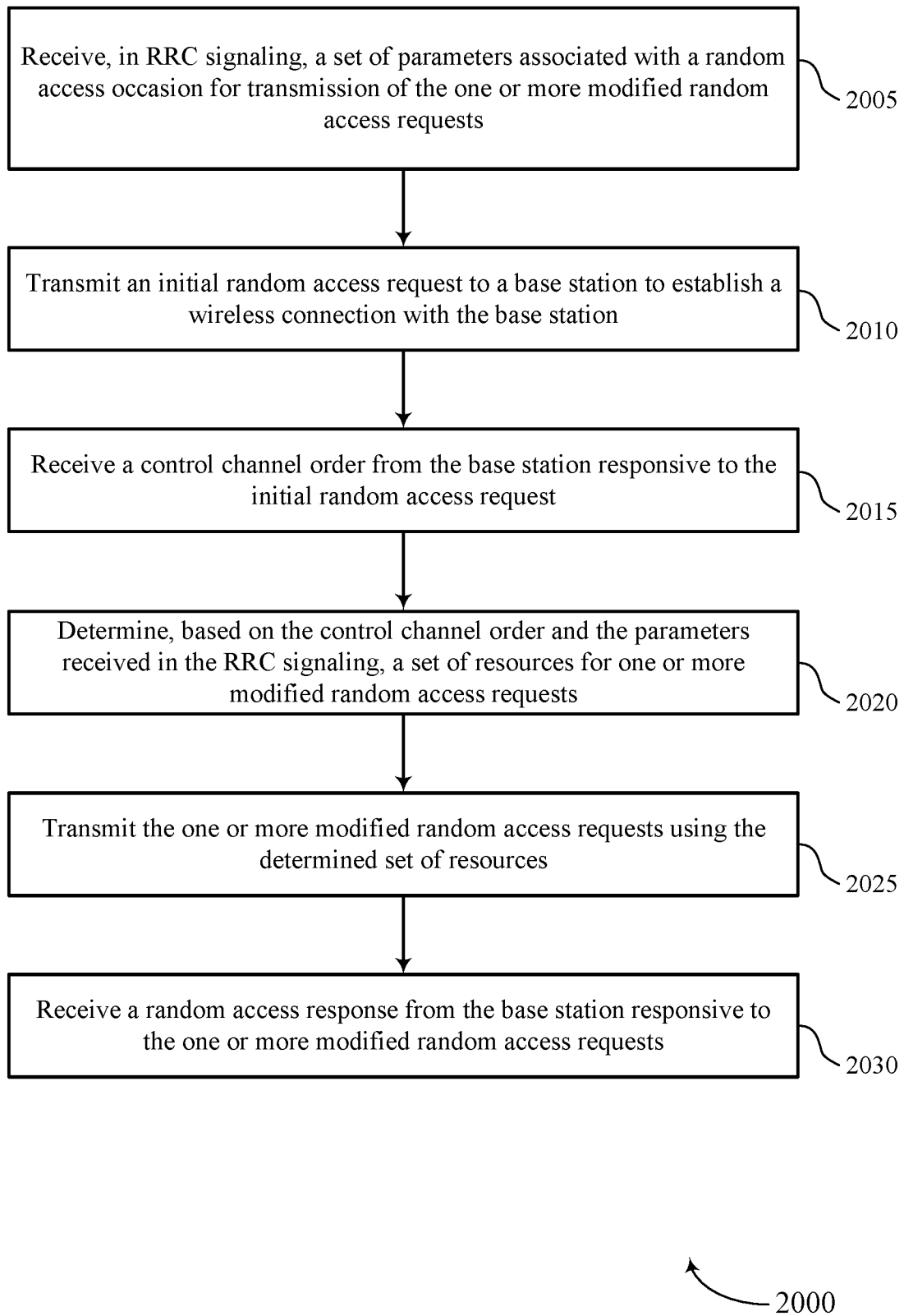

FIG. 20 shows a flowchart illustrating a method 2000 that supports beam refinement techniques for random access communications in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2005, the UE may receive, in RRC signaling, a set of parameters associated with a random access occasion for transmission of the one or more modified random access requests. The operations of 2005 may be performed according to the methods described herein. In some examples, aspects of the operations of 2005 may be performed by a resource manager as described with reference to FIGS. 9 through 12.

At 2010, the UE may transmit an initial random access request to a base station to establish a wireless connection with the base station. The operations of 2010 may be performed according to the methods described herein. In some examples, aspects of the operations of 2010 may be performed by a random access request manager as described with reference to FIGS. 9 through 12.

At 2015, the UE may receive a control channel order from the base station responsive to the initial random access request. The operations of 2015 may be performed according to the methods described herein. In some examples, aspects of the operations of 2015 may be performed by a control channel order manager as described with reference to FIGS. 9 through 12.

At 2020, the UE may determine, based on the control channel order and the parameters received in the RRC signaling, a set of resources for one or more modified random access requests. The operations of 2020 may be performed according to the methods described herein. In some examples, aspects of the operations of 2020 may be performed by a resource manager as described with reference to FIGS. 9 through 12.

At 2025, the UE may transmit the one or more modified random access requests using the determined set of resources. The operations of 2025 may be performed according to the methods described herein. In some examples, aspects of the operations of 2025 may be performed by a beam refinement manager as described with reference to FIGS. 9 through 12.

At 2030, the UE may receive a random access response from the base station responsive to the one or more modified random access requests. The operations of 2030 may be performed according to the methods described herein. In some examples, aspects of the operations of 2030 may be performed by a random access response manager as described with reference to FIGS. 9 through 12.

Figure 21:
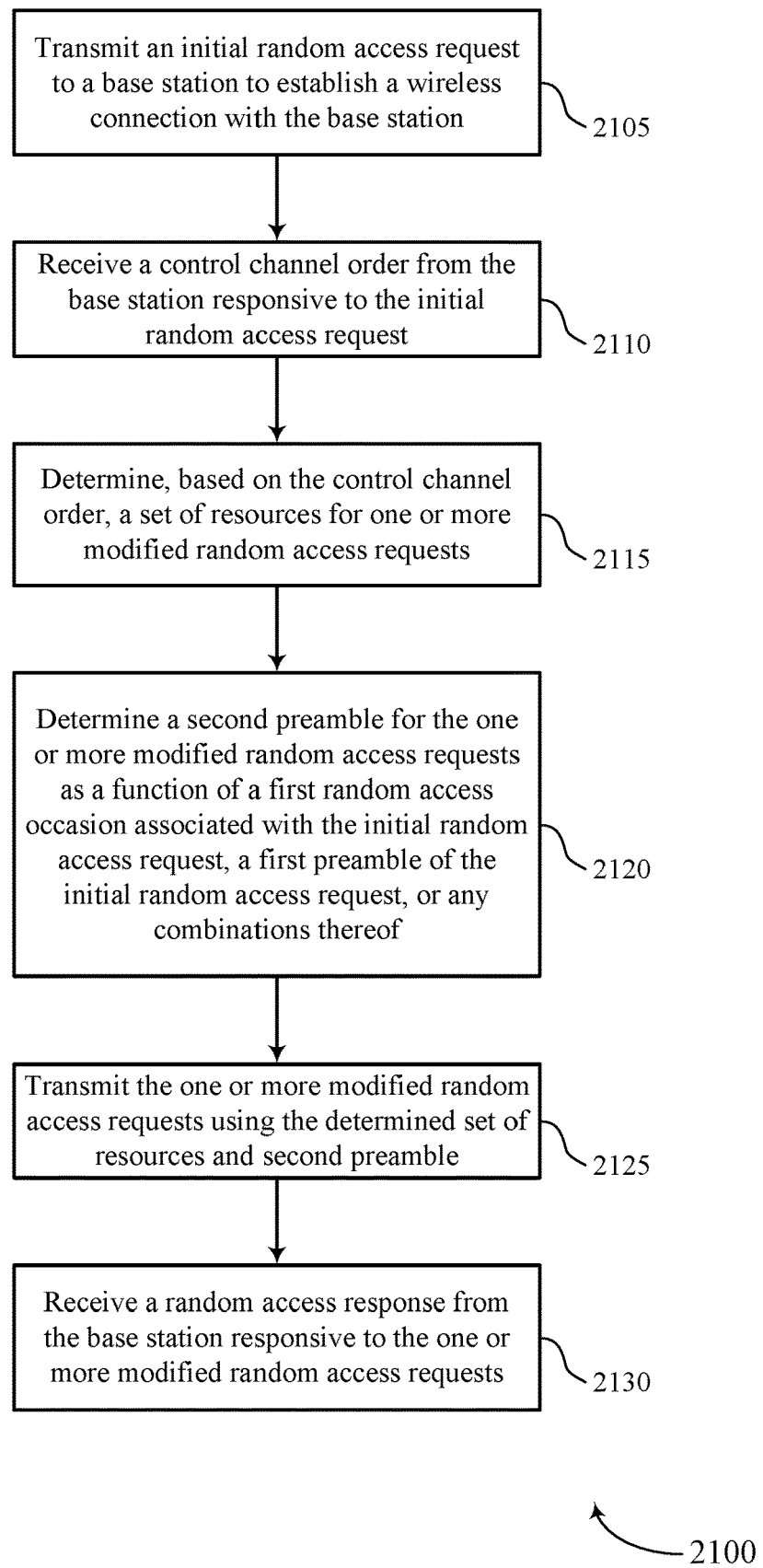

FIG. 21 shows a flowchart illustrating a method 2100 that supports beam refinement techniques for random access communications in accordance with aspects of the present disclosure. The operations of method 2100 may be implemented by a UE 115 or its components as described herein. For example, the operations of method 2100 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2105, the UE may transmit an initial random access request to a base station to establish a wireless connection with the base station. The operations of 2105 may be performed according to the methods described herein. In some examples, aspects of the operations of 2105 may be performed by a random access request manager as described with reference to FIGS. 9 through 12.

At 2110, the UE may receive a control channel order from the base station responsive to the initial random access request. The operations of 2110 may be performed according to the methods described herein. In some examples, aspects of the operations of 2110 may be performed by a control channel order manager as described with reference to FIGS. 9 through 12.

At 2115, the UE may determine, based on the control channel order, a set of resources for one or more modified random access requests. The operations of 2115 may be performed according to the methods described herein. In some examples, aspects of the operations of 2115 may be performed by a resource manager as described with reference to FIGS. 9 through 12.

At 2120, the UE may determine a second preamble for the one or more modified random access requests as a function of a first random access occasion associated with the initial random access request, a first preamble of the initial random access request, or any combinations thereof. The operations of 2120 may be performed according to the methods described herein. In some examples, aspects of the operations of 2120 may be performed by a preamble sequence manager as described with reference to FIGS. 9 through 12.

At 2125, the UE may transmit the one or more modified random access requests using the determined set of resources and the second preamble. The operations of 2125 may be performed according to the methods described herein. In some examples, aspects of the operations of 2125 may be performed by a beam refinement manager as described with reference to FIGS. 9 through 12.

At 2130, the UE may receive a random access response from the base station responsive to the one or more modified random access requests. The operations of 2130 may be performed according to the methods described herein. In some examples, aspects of the operations of 2130 may be performed by a random access response manager as described with reference to FIGS. 9 through 12.

Figure 22:
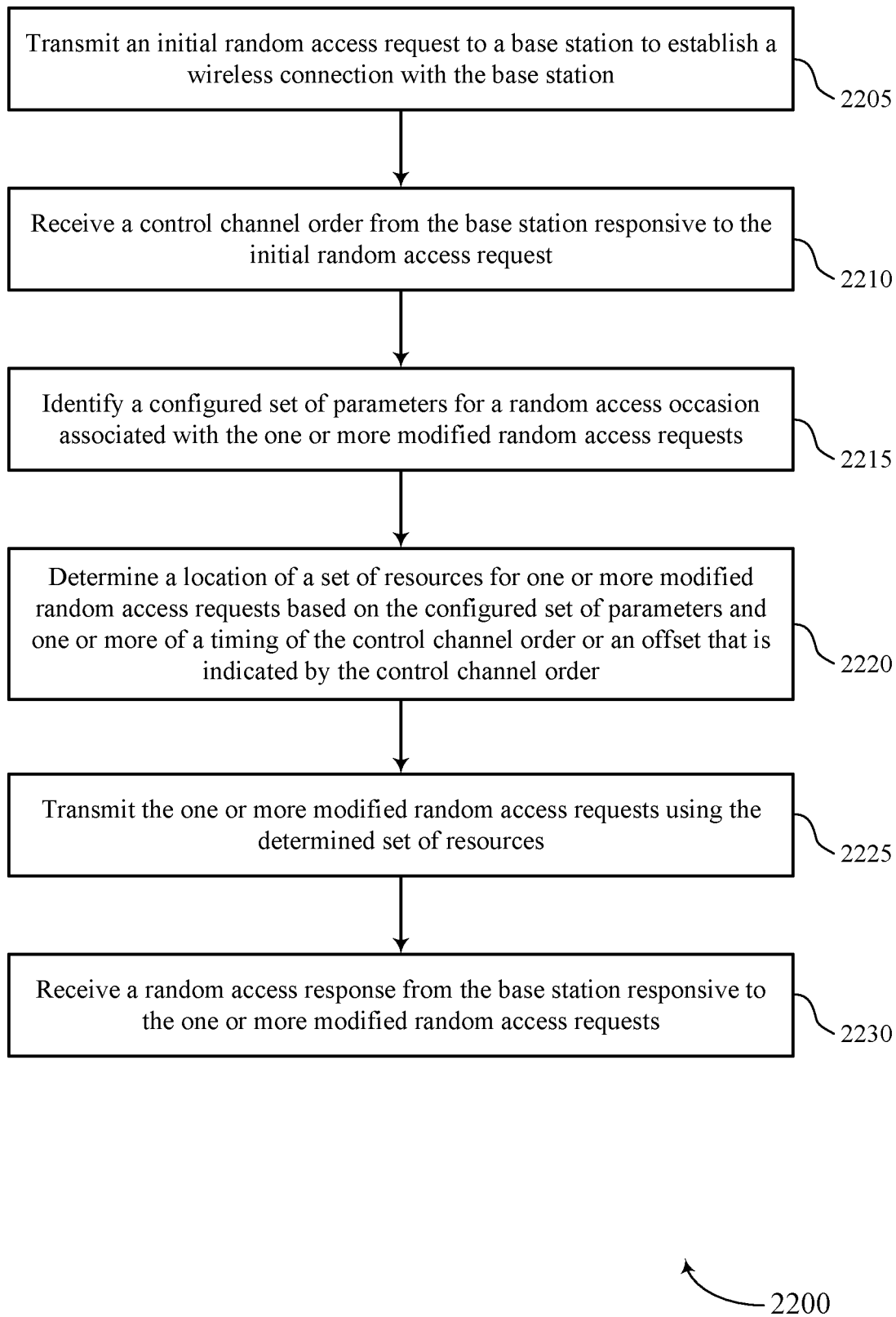

FIG. 22 shows a flowchart illustrating a method 2200 that supports beam refinement techniques for random access communications in accordance with aspects of the present disclosure. The operations of method 2200 may be implemented by a UE 115 or its components as described herein. For example, the operations of method 2200 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2205, the UE may transmit an initial random access request to a base station to establish a wireless connection with the base station. The operations of 2205 may be performed according to the methods described herein. In some examples, aspects of the operations of 2205 may be performed by a random access request manager as described with reference to FIGS. 9 through 12.

At 2210, the UE may receive a control channel order from the base station responsive to the initial random access request. The operations of 2210 may be performed according to the methods described herein. In some examples, aspects of the operations of 2210 may be performed by a control channel order manager as described with reference to FIGS. 9 through 12.

At 2215, the UE may identify a configured set of parameters for a random access occasion associated with the one or more modified random access requests. The operations of 2215 may be performed according to the methods described herein. In some examples, aspects of the operations of 2215 may be performed by a resource manager as described with reference to FIGS. 9 through 12.

At 2220, the UE may determine a location of a set of resources for one or more modified random access requests based on the configured set of parameters and one or more of a timing of the control channel order or an offset that is indicated by the control channel order. The operations of 2220 may be performed according to the methods described herein. In some examples, aspects of the operations of 2220 may be performed by a resource manager as described with reference to FIGS. 9 through 12.

At 2225, the UE may transmit the one or more modified random access requests using the determined set of resources. The operations of 2225 may be performed according to the methods described herein. In some examples, aspects of the operations of 2225 may be performed by a beam refinement manager as described with reference to FIGS. 9 through 12.

At 2230, the UE may receive a random access response from the base station responsive to the one or more modified random access requests. The operations of 2230 may be performed according to the methods described herein. In some examples, aspects of the operations of 2230 may be performed by a random access response manager as described with reference to FIGS. 9 through 12.

Figure 23:
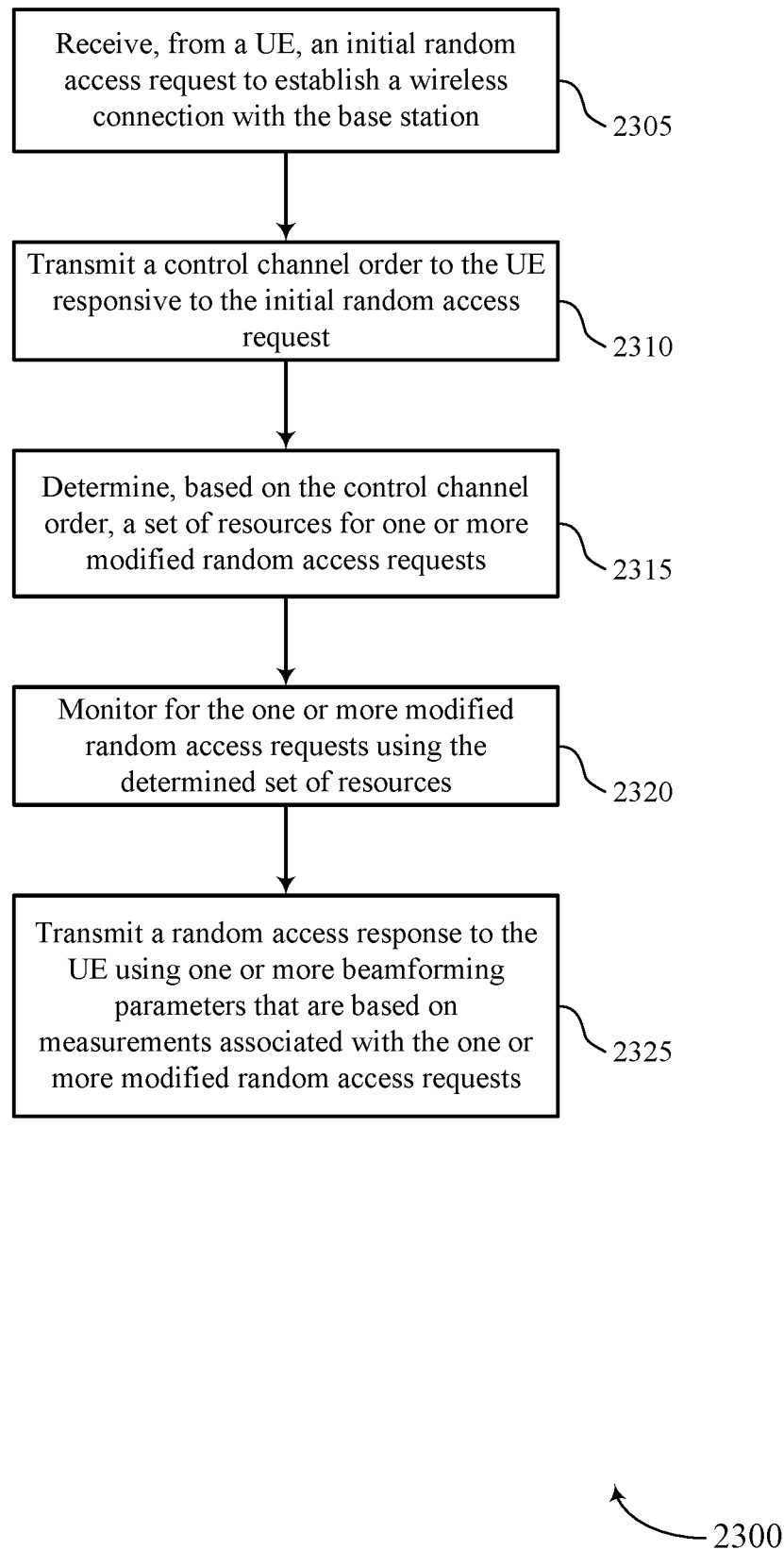

FIG. 23 shows a flowchart illustrating a method 2300 that supports beam refinement techniques for random access communications in accordance with aspects of the present disclosure. The operations of method 2300 may be implemented by a base station 105 or its components as described herein. For example, the operations of method 2300 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2305, the base station may receive, from a UE, an initial random access request to establish a wireless connection with the base station. The operations of 2305 may be performed according to the methods described herein. In some examples, aspects of the operations of 2305 may be performed by a random access request manager as described with reference to FIGS. 13 through 16.

At 2310, the base station may transmit a control channel order to the UE responsive to the initial random access request. The operations of 2310 may be performed according to the methods described herein. In some examples, aspects of the operations of 2310 may be performed by a control channel order manager as described with reference to FIGS. 13 through 16.

At 2315, the base station may determine, based on the control channel order, a set of resources for one or more modified random access requests. The operations of 2315 may be performed according to the methods described herein. In some examples, aspects of the operations of 2315 may be performed by a resource manager as described with reference to FIGS. 13 through 16.

At 2320, the base station may monitor for the one or more modified random access requests using the determined set of resources. The operations of 2320 may be performed according to the methods described herein. In some examples, aspects of the operations of 2320 may be performed by a resource manager as described with reference to FIGS. 13 through 16.

At 2325, the base station may transmit a random access response to the UE using one or more beamforming parameters that are based on measurements associated with the one or more modified random access requests. The operations of 2325 may be performed according to the methods described herein. In some examples, aspects of the operations of 2325 may be performed by a random access response manager as described with reference to FIGS. 13 through 16.

Figure 24:
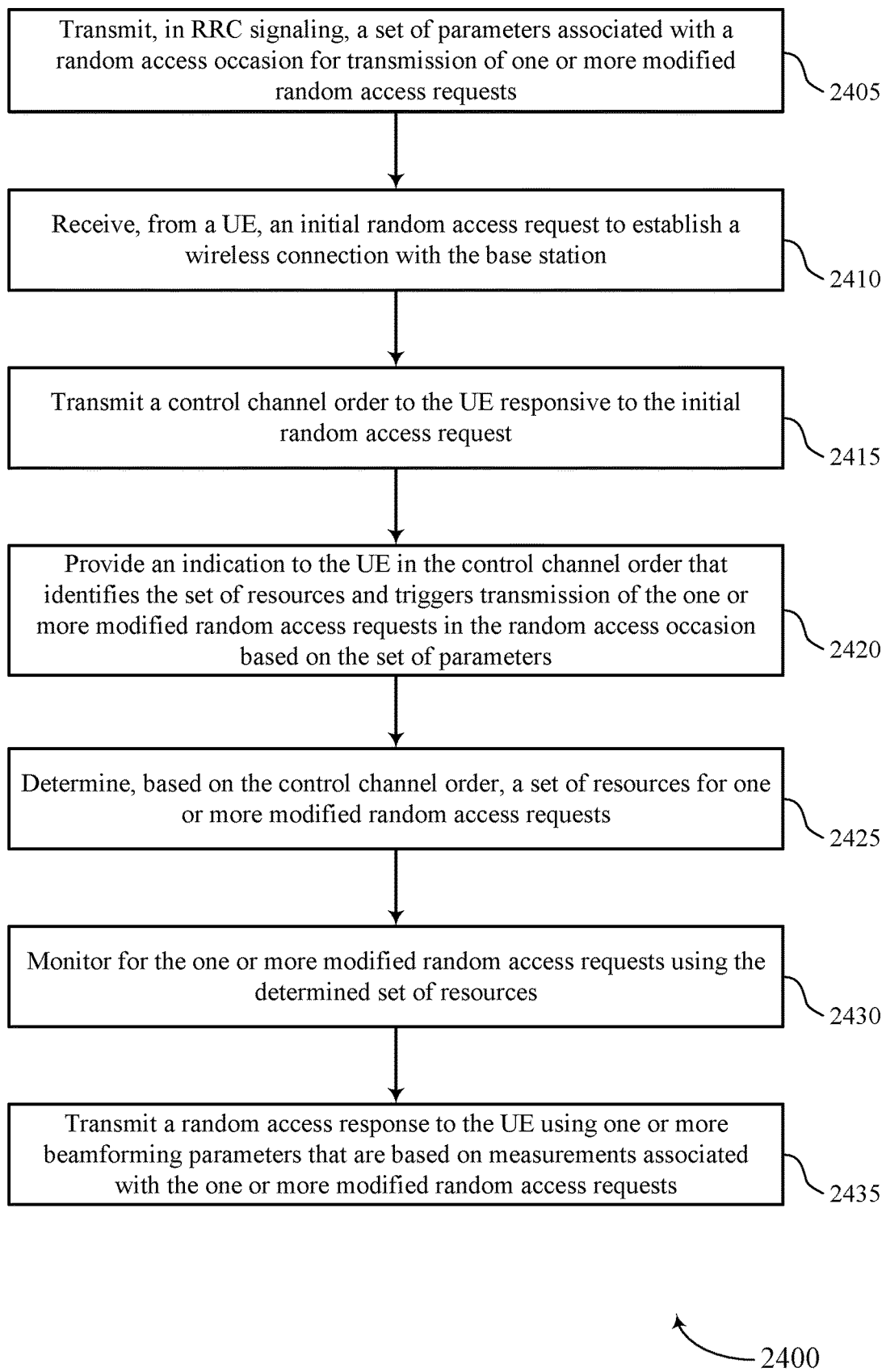

FIG. 24 shows a flowchart illustrating a method 2400 that supports beam refinement techniques for random access communications in accordance with aspects of the present disclosure. The operations of method 2400 may be implemented by a base station 105 or its components as described herein. For example, the operations of method 2400 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2405, the base station may transmit, in RRC signaling, a set of parameters associated with a random access occasion for transmission of one or more modified random access requests. The operations of 2405 may be performed according to the methods described herein. In some examples, aspects of the operations of 2405 may be performed by a resource manager as described with reference to FIGS. 13 through 16.

At 2410, the base station may receive, from a UE, an initial random access request to establish a wireless connection with the base station. The operations of 2410 may be performed according to the methods described herein. In some examples, aspects of the operations of 2410 may be performed by a random access request manager as described with reference to FIGS. 13 through 16.

At 2415, the base station may transmit a control channel order to the UE responsive to the initial random access request. The operations of 2415 may be performed according to the methods described herein. In some examples, aspects of the operations of 2415 may be performed by a control channel order manager as described with reference to FIGS. 13 through 16.

At 2420, the base station may provide an indication to the UE in the control channel order that identifies the set of resources and triggers transmission of the one or more modified random access requests in the random access occasion based on the set of parameters. The operations of 2420 may be performed according to the methods described herein. In some examples, aspects of the operations of 2420 may be performed by a control channel order manager as described with reference to FIGS. 13 through 16.

At 2425, the base station may determine, based on the control channel order, a set of resources for one or more modified random access requests. The operations of 2425 may be performed according to the methods described herein. In some examples, aspects of the operations of 2425 may be performed by a resource manager as described with reference to FIGS. 13 through 16.

At 2430, the base station may monitor for the one or more modified random access requests using the determined set of resources. The operations of 2430 may be performed according to the methods described herein. In some examples, aspects of the operations of 2430 may be performed by a resource manager as described with reference to FIGS. 13 through 16.

At 2435, the base station may transmit a random access response to the UE using one or more beamforming parameters that are based on measurements associated with the one or more modified random access requests. The operations of 2435 may be performed according to the methods described herein. In some examples, aspects of the operations of 2435 may be performed by a random access response manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: transmitting an initial random access request to a base station to establish a wireless connection with the base station; receiving a control channel order from the base station responsive to the initial random access request; transmitting one or more modified random access requests using a set of resources that are based at least in part on the control channel order; and receiving a random access response from the base station responsive to the one or more modified random access requests.

Aspect 2: The method of aspect 1, wherein one or more parameters for the one or more modified random access requests are based at least in part on a first random access occasion that has a same random access occasion configuration as the initial random access request.

Aspect 3: The method of aspect 2, wherein the set of resources is in a subsequent random access occasion to the first random access occasion that is determined based at least in part on the control channel order, wherein the subsequent random access occasion is associated with a same synchronization signal block (SSB) as the first random access occasion.

Aspect 4: The method of any of aspects 2 through 3, further comprising: selecting, from a first subset of preamble sequences associated with the first random access occasion, a first preamble sequence for the one or more modified random access requests, wherein the first subset of preamble sequences is non-overlapping with a second subset preamble sequences that are available for initial random access requests associated with the first random access occasion.

Aspect 5: The method of aspect 1, wherein the set of resources for the one or more modified random access requests is based at least in part on a second random access occasion configuration that is different than a first random access occasion configuration of the initial random access request, and wherein the second random access occasion configuration is received in RRC signaling from the base station.

Aspect 6: The method of aspect 5, wherein the second random access occasion configuration is associated with a synchronization signal block (SSB) that was used to identify uplink resources for the initial random access request.

Aspect 7: The method of aspect 6, wherein a plurality of different random access occasions for transmission of modified random access requests are configured for each of a plurality of different SSBs.

Aspect 8: The method of any of aspects 5 through 7, wherein the second random access occasion configuration is unassociated with any synchronization signal block (SSB).

Aspect 9: The method of aspect 1, wherein the determining further comprises: identifying the set of resources based at least in part on an indication provided by the control channel order.

Aspect 10: The method of aspect 9, further comprising: receiving, in RRC signaling, a set of parameters associated with a random access occasion for transmission of the one or more modified random access requests, and wherein the control channel order triggers transmission of the one or more modified random access requests in the random access occasion, and wherein the RRC signaling provides one or more of time resources or frequency resources for the random access occasion, a number of repetitions for the one or more modified random access requests, or any combinations thereof.

Aspect 11: The method of aspect 10, wherein the control channel order acts as an uplink grant for the one or more modified random access requests using the set of resources, and the set of resources are determined based at least in part on a location of the control channel order.

Aspect 12: The method of any of aspects 1 through 11, further comprising: determining a second preamble for the one or more modified random access requests as a function of a first random access occasion associated with the initial random access request, a first preamble of the initial random access request, or any combinations thereof, and wherein the function is further based at least in part on a control value provided in the control channel order.

Aspect 13: The method of aspect 12, wherein the function outputs one or more of a frequency domain index for the one or more modified random access requests, a preamble index for the one or more modified random access requests, or any combinations thereof.

Aspect 14: The method of any of aspects 12 through 13, wherein a same preamble is used for each of two or more repetitions of a modified random access request, or a different preamble is used for each of two or more repetitions of the modified random access request based on a hopping algorithm.

Aspect 15: The method of any of aspects 1 through 14, wherein a starting random access occasion index associated with the set of resources is determined based at least in part on a time domain location of the control channel order.

Aspect 16: The method of any of aspects 1 through 15, further comprising: determining a second random access preamble for the one or more modified random access requests as a function of a first random access preamble used for the initial random access request.

Aspect 17: The method of any of aspects 1 through 16, wherein the set of resources includes resources in a second random access occasion that is determined as a function of a first random access occasion associated with the initial random access request.

Aspect 18: A method for wireless communication at a base station, comprising: receiving, from a UE, an initial random access request to establish a wireless connection with the base station; transmitting a control channel order to the UE responsive to the initial random access request; determining, based at least in part on the control channel order, a set of resources for one or more modified random access requests; monitoring for the one or more modified random access requests using the determined set of resources; and transmitting a random access response to the UE using one or more beamforming parameters that are based at least in part on measurements associated with the one or more modified random access requests.

Aspect 19: The method of aspect 18, wherein the determining further comprises: identifying one or more parameters for the one or more modified random access requests based at least in part on a first random access occasion that has a same random access occasion configuration as the initial random access request.

Aspect 20: The method of aspect 19, wherein the determining further comprises: identifying the set of resources in a subsequent random access occasion to the first random access occasion based at least in part on the control channel order, wherein the subsequent random access occasion is associated with a same synchronization signal block (SSB) as the first random access occasion.

Aspect 21: The method of any of aspects 19 through 20, wherein a first subset of preamble sequences of the first random access occasion are associated with initial random access request messages, and a second subset of preamble sequences of the first random access occasion are associated with modified random access messages, the first subset of preamble sequences is non-overlapping with the second subset of preamble sequences.

Aspect 22: The method of aspect 18, wherein the determining further comprises: identifying the set of resources for the one or more modified random access requests based at least in part on a second random access occasion configuration that is different than a first random access occasion configuration of the initial random access request.

Aspect 23: The method of aspect 22, wherein the second random access occasion configuration includes parameters for one or more of time resources of a second random access occasion, frequency resources of the second random access occasion, a number of repetitions of the one or more modified random access requests that are to be transmitted, or any combinations thereof.

Aspect 24: The method of aspect 18, further comprising: transmitting, in RRC signaling, a set of parameters associated with a random access occasion for transmission of the one or more modified random access requests, and wherein the control channel order triggers transmission of the one or more modified random access requests in the random access occasion.

Aspect 25: The method of any of aspects 18 through 24, further comprising: determining that the one or more modified random access requests are associated with the UE based on the one or more modified random access requests having a preamble that is a function of a first random access occasion associated with the initial random access request, a first preamble of the initial random access request, or any combinations thereof.

Aspect 26: An apparatus for wireless communication at a UE, comprising a processor; memory coupled with the processor; and instructions stored in the memory and executable by the processor to cause the apparatus to perform a method of any of aspects 1 through 17.

Aspect 27: An apparatus for wireless communication at a UE, comprising at least one means for performing a method of any of aspects 1 through 17.

Aspect 28: A non-transitory computer-readable medium storing code for wireless communication at a UE, the code comprising instructions executable by a processor to perform a method of any of aspects 1 through 17.

Aspect 29: An apparatus for wireless communication at a base station, comprising a processor; memory coupled with the processor; and instructions stored in the memory and executable by the processor to cause the apparatus to perform a method of any of aspects 18 through 25.

Aspect 30: An apparatus for wireless communication at a base station, comprising at least one means for performing a method of any of aspects 18 through 25.

Aspect 31: A non-transitory computer-readable medium storing code for wireless communication at a base station, the code comprising instructions executable by a processor to perform a method of any of aspects 18 through 25.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting an initial random access request to a base station to establish a wireless connection with the base station;
    receiving, subsequent to the transmitting the initial random access request, a control channel order from the base station responsive to the initial random access request, the control channel order indicating that the UE is to transmit one or more modified random access requests;
    transmitting, in response to the control channel order, the one or more modified random access requests using a set of resources that are based at least in part on the control channel order; and
    receiving a random access response from the base station responsive to the one or more modified random access requests.

2. The method of claim 1, wherein:
    one or more parameters for the one or more modified random access requests are based at least in part on a first random access occasion that has a same random access occasion configuration as the initial random access request.

3. The method of claim 2, wherein:
    the set of resources is in a subsequent random access occasion to the first random access occasion that is determined based at least in part on the control channel order, wherein the subsequent random access occasion is associated with a same synchronization signal block (SSB) as the first random access occasion.

4. The method of claim 2, further comprising:
    selecting, from a first subset of preamble sequences associated with the first random access occasion, a first preamble sequence for the one or more modified random access requests, wherein the first subset of preamble sequences is non-overlapping with a second subset preamble sequences that are available for initial random access requests associated with the first random access occasion.

5. The method of claim 1, wherein:
the set of resources for the one or more modified random access requests is based at least in part on a second random access occasion configuration that is different than a first random access occasion configuration of the initial random access request, and wherein the second random access occasion configuration is received in radio resource control (RRC) signaling from the base station.

6. The method of claim 5, wherein the second random access occasion configuration is associated with a synchronization signal block (SSB) that was used to identify uplink resources for the initial random access request.

7. The method of claim 6, wherein a plurality of different random access occasions for transmission of modified random access requests are configured for each of a plurality of different SSBs.

8. The method of claim 5, wherein the second random access occasion configuration is unassociated with any synchronization signal block (SSB).

9. The method of claim 1, further comprising:
identifying the set of resources based at least in part on an indication provided by the control channel order.

10. The method of claim 9, further comprising:
receiving, in radio resource control (RRC) signaling, a set of parameters associated with a random access occasion for transmission of the one or more modified random access requests, and wherein the control channel order triggers transmission of the one or more modified random access requests in the random access occasion, and wherein the RRC signaling provides one or more of time resources or frequency resources for the random access occasion, a number of repetitions for the one or more modified random access requests, or any combinations thereof.

11. The method of claim 10, wherein the control channel order acts as an uplink grant for the one or more modified random access requests using the set of resources, and wherein the set of resources are determined based at least in part on a location of the control channel order.

12. The method of claim 1, further comprising:
determining a second preamble for the one or more modified random access requests as a function of a first random access occasion associated with the initial random access request, a first preamble of the initial random access request, or any combinations thereof, and wherein the function is further based at least in part on a control value provided in the control channel order.

13. The method of claim 12, wherein the function outputs one or more of a frequency domain index for the one or more modified random access requests, a preamble index for the one or more modified random access requests, or any combinations thereof.

14. The method of claim 12, wherein a same preamble is used for each of two or more repetitions of a modified random access request, or a different preamble is used for each of two or more repetitions of the modified random access request based on a hopping algorithm.

15. The method of claim 1, wherein a starting random access occasion index associated with the set of resources is determined based at least in part on a time domain location of the control channel order.

16. The method of claim 1, further comprising:
determining a second random access preamble for the one or more modified random access requests as a function of a first random access preamble used for the initial random access request.

17. The method of claim 1, wherein the set of resources includes resources in a second random access occasion that is determined as a function of a first random access occasion associated with the initial random access request.

18. A method for wireless communication at a base station, comprising:
receiving, from a user equipment (UE), an initial random access request to establish a wireless connection with the base station;
transmitting a control channel order to the UE responsive to the initial random access request;
determining, based at least in part on the control channel order, a set of resources for one or more modified random access requests;
monitoring for the one or more modified random access requests using the determined set of resources; and
transmitting a random access response to the UE using one or more beamforming parameters that are based at least in part on measurements associated with the one or more modified random access requests.

19. The method of claim 18, wherein the determining further comprises:
identifying one or more parameters for the one or more modified random access requests based at least in part on a first random access occasion that has a same random access occasion configuration as the initial random access request.

20. The method of claim 19, wherein the determining further comprises:
identifying the set of resources in a subsequent random access occasion to the first random access occasion based at least in part on the control channel order, wherein the subsequent random access occasion is associated with a same synchronization signal block (SSB) as the first random access occasion.

21. The method of claim 19, wherein a first subset of preamble sequences of the first random access occasion are associated with initial random access request messages, and a second subset of preamble sequences of the first random access occasion are associated with modified random access messages, wherein the first subset of preamble sequences is non-overlapping with the second subset of preamble sequences.

22. The method of claim 18, wherein the determining further comprises:
identifying the set of resources for the one or more modified random access requests based at least in part on a second random access occasion configuration that is different than a first random access occasion configuration of the initial random access request.

23. The method of claim 22, wherein the second random access occasion configuration includes parameters for one or more of time resources of a second random access occasion, frequency resources of the second random access occasion, a number of repetitions of the one or more modified random access requests that are to be transmitted, or any combinations thereof.

24. The method of claim 18, further comprising:
transmitting, in radio resource control (RRC) signaling, a set of parameters associated with a random access occasion for transmission of the one or more modified random access requests, and wherein the control channel order triggers transmission of the one or more modified random access requests in the random access occasion.

25. The method of claim 18, further comprising:
determining that the one or more modified random access requests are associated with the UE based on the one or more modified random access requests having a preamble that is a function of a first random access occasion associated with the initial random access request, a first preamble of the initial random access request, or any combinations thereof.

26. An apparatus for wireless communication at a user equipment (UE), comprising:
a processor, memory coupled with the processor; and
instructions stored in the memory and executable by the processor to cause the apparatus to:
transmit an initial random access request to a base station to establish a wireless connection with the base station;
receive, subsequent to transmission of the initial random access request, a control channel order from the base station responsive to the initial random access request, the control channel order indicating that the UE is to transmit one or more modified random access requests;
transmit, in response to the control channel order, the one or more modified random access requests using a set of resources that are based at least in part on the control channel order; and
receive a random access response from the base station responsive to the one or more modified random access requests.

27. The apparatus of claim 26, wherein:
one or more parameters for the one or more modified random access requests are based at least in part on a first random access occasion that has a same random access occasion configuration as the initial random access request.

28. The apparatus of claim 27, wherein:
the set of resources is in a subsequent random access occasion to the first random access occasion that is determined based at least in part on the control channel order, wherein the subsequent random access occasion is associated with a same synchronization signal block (SSB) as the first random access occasion.

29. An apparatus for wireless communication at a base station, comprising:
a processor, memory coupled with the processor; and
instructions stored in the memory and executable by the processor to cause the apparatus to:
receive, from a user equipment (UE), an initial random access request to establish a wireless connection with the base station;
transmit a control channel order to the UE responsive to the initial random access request;
determine, based at least in part on the control channel order, a set of resources for one or more modified random access requests;
monitor for the one or more modified random access requests using the determined set of resources; and
transmit a random access response to the UE using one or more beamforming parameters that are based at least in part on measurements associated with the one or more modified random access requests.

30. The apparatus of claim 29, wherein the instructions are further executable by the processor to cause the apparatus to:
identify one or more parameters for the one or more modified random access requests based at least in part on a first random access occasion that has a same random access occasion configuration as the initial random access request.

* * * * *